(12) United States Patent
Aikawa

(10) Patent No.: US 11,836,313 B2
(45) Date of Patent: Dec. 5, 2023

(54) INPUT DEVICE, INPUT METHOD, AND IMAGE FORMING DEVICE HAVING TOUCHSCREEN WITH VARIABLE DETECTION AREA

(71) Applicant: KONICA MINOLTA, INC., Tokyo (JP)

(72) Inventor: Masafumi Aikawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/880,192

(22) Filed: Aug. 3, 2022

(65) Prior Publication Data
US 2023/0079360 A1 Mar. 16, 2023

(30) Foreign Application Priority Data
Sep. 15, 2021 (JP) .................................. 2021-150327

(51) Int. Cl.
| | | |
|---|---|---|
| G06F 3/041 | (2006.01) | |
| G06F 3/04883 | (2022.01) | |
| H04N 1/00 | (2006.01) | |
| G06F 3/044 | (2006.01) | |

(52) U.S. Cl.
CPC ........ *G06F 3/0416* (2013.01); *G06F 3/04883* (2013.01); *G06F 3/0445* (2019.05); *G06F 2203/04808* (2013.01); *H04N 1/00411* (2013.01)

(58) Field of Classification Search
CPC .............. G06F 3/0416; G06F 3/04886; G06F 3/04847; G06F 3/0485; G06F 3/04845; G06F 3/04855; G06F 3/04883; G06F 3/0445; G06F 2203/04806; G06F 2203/04808; G06F 2203/04803; H04N 1/00411
See application file for complete search history.

(56) References Cited

U.S. PATENT DOCUMENTS

2014/0189507 A1* 7/2014 Valente ................... G06T 11/60
715/705

FOREIGN PATENT DOCUMENTS

| JP | 2007102442 A | 4/2007 |
|---|---|---|
| JP | 2018132937 A | 8/2018 |

* cited by examiner

*Primary Examiner* — Yaron Cohen
(74) *Attorney, Agent, or Firm* — BUCHANAN INGERSOLL & ROONEY PC

(57) ABSTRACT

An input device including a touchscreen sensor that detects a touch operation from a user, a non-transitory computer-readable recording medium including a program, and a hardware processor that executes the program to operate as: an area determination unit that determines whether a detected touch operation is performed in a first detection area; a trajectory determination unit that, when it is determined that the detected touch operation is performed in the first detection area, determines whether or not the detected touch operation indicates an operation drawing a linear trajectory; and a detection control unit that, when it is determined that the operation drawing a linear trajectory is indicated, controls the area determination unit to determine whether a next touch operation is performed in a second detection area that is larger than the first detection area.

20 Claims, 12 Drawing Sheets

Image forming device

INPUT DEVICE, INPUT METHOD, AND IMAGE FORMING DEVICE HAVING TOUCHSCREEN WITH VARIABLE DETECTION AREA

The entire disclosure of Japanese patent Application No. 2021-150327, filed on Sep. 15, 2021, is incorporated herein by reference in its entirety.

BACKGROUND

Technical Field

The present disclosure relates to reception of input due to a touch operation from a user.

Description of Related Art

Conventionally, in some multifunction peripherals (MFP) including functions such as a scanner, a printer, and a copy machine, instructions may be given to the MFP by moving a finger to draw a linear trajectory while in contact with a touch panel.

For example, when various print conditions are set for the MFP before print execution, a user may open a setting screen in which a large number of settings are displayed in a list. Next, a user selects one setting from the plurality of settings, and sets a corresponding condition. As there are many settings, there are some settings that cannot be displayed onscreen at the same time. In order to display (scroll to) settings that are not currently displayed, in addition to display of a plurality of settings, a scroll bar is displayed on the setting screen that is long in a direction along which the settings are lined up. An elevator is also displayed in the scroll bar. A user may move a finger within a range of the scroll bar while maintaining contact with elevator in the scroll bar so as to draw a linear trajectory along the long direction of the scroll bar. As a result, some displayed settings are scrolled off screen (removed), and some settings that were not displayed are scrolled onto the screen (displayed).

Here, the action of moving one finger in a specific direction while maintaining contact with the touch panel may be called swiping.

Further, for example, a touch operation called pinch-in or pinch-out may be performed in order to reduce or enlarge a preview image displayed on the screen of the touch panel. Pinch-in refers to the action of bringing two fingers closer to each other so as to draw a linear trajectory with each finger while maintaining contact with the touch panel. Pinch-out refers to the action of moving two fingers farther apart so as to draw a linear trajectory with each finger while maintaining contact with the touch panel.

JP 2018-132937 describes an input device that receives input from a user via detection of a touch operation. Icons X, Y, Z . . . are arranged in a matrix on a screen of a display of the input device. Each of the icons X, Y, Z . . . corresponds to a defined function X, Y, Z . . . respectively. When a touch operation is performed with respect to an icon Y, selection of the icon Y is provisionally confirmed, and a control unit of the input device enlarges a detection area of the icon Y to be larger than prior to the touch operation for final confirmation of selection.

In this way, upon touching an icon, an enlarged detection area is provided around the icon and a subsequent touch can touch the enlarged detection area, making the subsequent touch operation easier.

SUMMARY

When the conventional technique described above is applied to a case in which items in a list displayed together with a scroll bar are scrolled, the results are as follows.

When a user touches the elevator in the scroll bar, an enlarged detection area is provided around the elevator beyond the range of the scroll bar. This makes subsequent touch operation with respect to the elevator easier. However, enlarging a detection area of the elevator does not contribute to an improvement in operability when moving the elevator along the scroll bar. For example, when moving a finger while in contact with the elevator and the finger leaves the scroll bar, this will not be recognized as an operation to move the elevator, and therefore the elevator cannot be moved along the scroll bar. As a result, there is a problem that scrolling cannot be performed as desired by the user.

In a case where a pinch-in or pinch-out touch operation is used in order to reduce or enlarge a preview image displayed on a touch panel screen, as described above, icons such as those described above are not displayed in the preview image, and therefore a detection area of an icon is not enlarged when a user performs a touch operation.

An object of the present disclosure is to provide an input device, an input method, and an image forming device capable of facilitating second and subsequent linear touch operations.

An aspect of the present disclosure is an input device comprising: a touchscreen sensor that detects a touch operation from a user; a non-transitory computer-readable recording medium comprising a program; and a hardware processor that executes the program to operate as: an area determination unit that determines whether a detected touch operation is performed in a first detection area; a trajectory determination unit that, when it is determined that the detected touch operation is performed in the first detection area, determines whether or not the detected touch operation indicates an operation drawing a linear trajectory; and a detection control unit that, when it is determined that the operation drawing a linear trajectory is indicated, controls the area determination unit to determine whether a next touch operation is performed in a second detection area that is larger than the first detection area.

Another aspect of the present disclosure is an input method used in an input device comprising a touchscreen sensor that detects a touch operation from a user, the input method comprising: determining whether a detected touch operation is performed in a first detection area; when it is determined that the detected touch operation is performed in the first detection area, determining whether or not the detected touch operation indicates an operation drawing a linear trajectory; and when it is determined that the operation drawing a linear trajectory is indicated, determining whether a next touch operation is performed in a second detection area that is larger than the first detection area.

Another aspect of the present disclosure is an image forming device comprising the input device.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the invention. In the drawings.

DETAILED DESCRIPTION

Hereinafter, one or more embodiments of the present disclosure will be described with reference to the drawings. However, the scope of the invention is not limited to the disclosed embodiments.

1. EMBODIMENT 1

An image forming device 10 is described as embodiment 1.

1.1. Image Forming Device 10

Figure 1A:
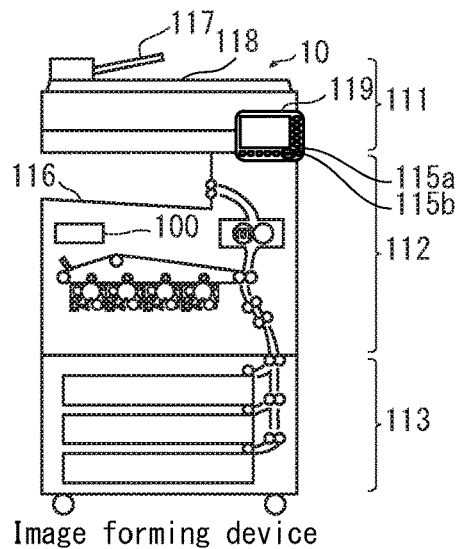
FIG. 1A illustrates overall structure of an image forming device 10.

As illustrated in FIG. 1A, the image forming device 10 is a tandem type color multifunction peripheral (MFP) that has functions such as those of a scanner, a printer, and a copy machine.

The image forming device 10 is provided with a sheet feeder 113 at a lower end of a housing, the sheet feeder 113 accommodating and feeding out sheets. Above the sheet feeder 113 is provided a printer 112 that forms an image by an electrophotographic method. Above the printer 112 is provided an image reader 111 that scans a document and generates image data, and an operation panel 119 that has a screen and receives input operations from a user.

The image reader 111 has an automatic document feeder (ADF). The ADF conveys documents set in a document tray 117 to a defined scanning position one by one via a conveyance path. The image reader 111 uses a scanner to scan a document conveyed to a scanning position by the ADF or scans a document placed on a document glass plate by a user, to obtain image data consisting of red (R), green (G), and blue (B) multi-valued digital signals. The image reader 111 conveys a document that has been conveyed from the document tray 117 and scanned to a document ejection tray 118.

Image data of each color component obtained by the image reader 111 then undergoes various data processing by the control circuitry 100, and is further converted to image data in reproduction colors yellow (Y), magenta (M), cyan (C), and black (K).

The printer 112 includes an intermediate transfer belt held taut by a drive roller, a driven roller, and a backup roller, a secondary transfer roller, four imaging units arranged at defined intervals along a travel direction of the intermediate transfer belt, a fixing unit, and the control circuitry 100.

The four imaging units form toner images in Y, M, C, and K colors, respectively. Specifically, each imaging unit includes a photoconductor drum that is an image carrier, a light emitting diode (LED) array for exposure scanning a surface of the photoconductor drum, a charger, a developer, a cleaner, and a primary transfer roller.

The sheet feeder 113 is composed of sheet feed cassettes that can accommodate sheets of different sizes and pickup rollers for feeding sheets from the sheet feed cassettes to a conveyance path.

In each of the imaging units, the photoconductor drum is uniformly charged by the charger and exposed by the LED array to form an electrostatic latent image on the surface of the photoconductor drum. Each electrostatic latent image is developed by the developer of the corresponding color to form Y, M, C, K color toner images on the surfaces of the photoconductor drums. The toner images are then transferred in order onto a surface of the intermediate transfer belt by electrostatic action of the primary transfer rollers arranged along a back surface side of the intermediate transfer belt.

The imaging timing for each color is staggered so that the Y, M, C, K color toner images are transferred onto the same position on the intermediate transfer belt.

On the other hand, a sheet is fed from any one of the sheet feed cassettes of the sheet feeder 113, in accordance with the imaging operation by the imaging units.

The sheet is conveyed on the conveyance path to a secondary transfer position where the secondary transfer roller and the backup roller face each other across the intermediate transfer belt. At the secondary transfer position, the Y, M, C, K color toner image that has been transferred onto the intermediate transfer belt is transferred onto the sheet due to electrostatic action of the secondary transfer roller. The sheet on which the Y, M, C, K color toner image has been transferred is further conveyed to the fixing unit.

The toner image on the surface of the sheet melts and is fixed onto the surface of the sheet by heat and pressure as it passes through a fixing nip formed between a heating roller and a pressure roller of the fixing unit. After passing through the fixing unit, the sheet is sent to a printed matter ejection tray 116.

The operation panel 119 (cancellation receiver) includes a touch panel 130, operation buttons, a speaker 115a, and a microphone 115b (voice input unit).

Figure 2A:
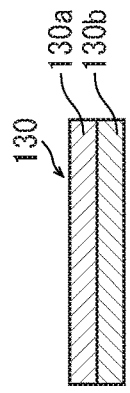
FIG. 2A illustrates a cross-section of a touch panel 130.

The touch panel 130 is composed of a display 130b that includes a liquid crystal display panel or the like and a touch unit 130a superimposed on an upper surface of the display 130b that detects contact with a user's finger or a touch pen or the like (operator) (see FIG. 2A). FIG. 2A illustrates a cross-section of the touch panel 130. Each of the operation buttons receives a press from a user's finger or the like. The speaker 115a (audio output) converts an analog audio signal into sound and outputs the audio. The microphone 115b converts sound into an electrical signal (analog audio signal).

The touch panel 130 displays content set by a user and various messages. Further, the touch panel 130 and the operation buttons receive operations from a user to start copying, to set a number of copies, to set copy conditions, to set a data output destination, to set position, size, and the like of a detection area set by a user, and return a second detection area to a first detection area, and send a notification of a received operation to the control circuitry 100. The detection area, first detection area, and second detection area are described later.

1.2. Touch Unit 130a

As an example, the touch unit 130a is a contact detection device (touchscreen sensor) that detects contact by a projection type capacitance method, and has a structure in which two electrode layers, an X axis direction electrode layer and a Y axis direction electrode layer, form a matrix. By capturing a change in capacitance at each of the X axis electrode and the Y axis electrode, a contact position of XY coordinates is detected as a detection signal. That is, the touch unit 130a detects a touch operation from a user.

The touch unit 130a outputs an X coordinate value and a Y coordinate value of a detected contact position to input/output circuitry 158 as a detection signal.

Figure 2B:
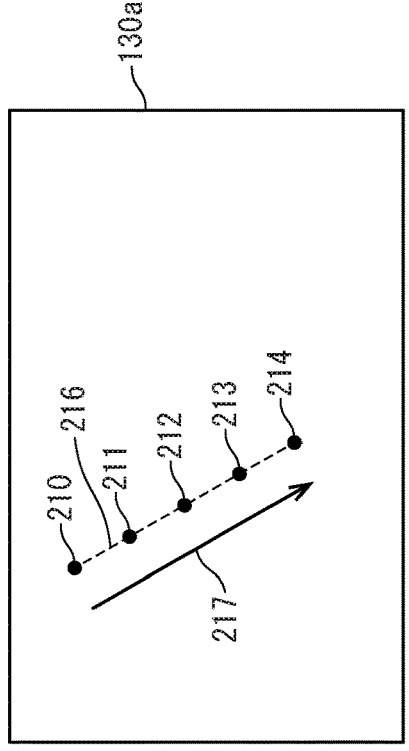
FIG. 2B graphically illustrates a detection signal 201 output from a touch unit 130a when contact is made at one point.
Figure 2C:
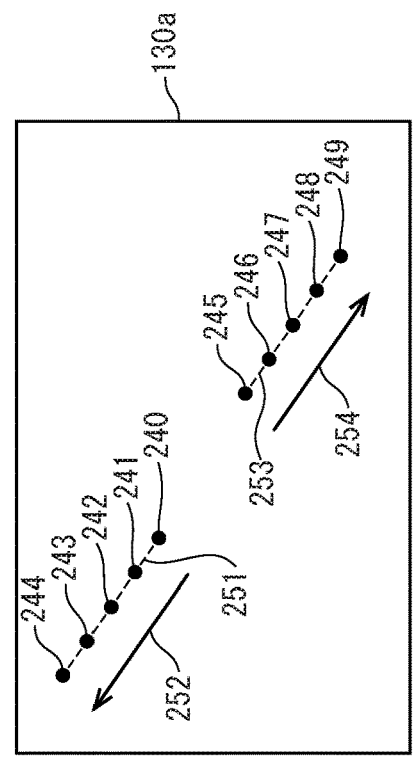
FIG. 2C graphically illustrates detection signals 210-214 output from the touch unit 130a when contact is made in one line (a swipe).
Figure 2D:
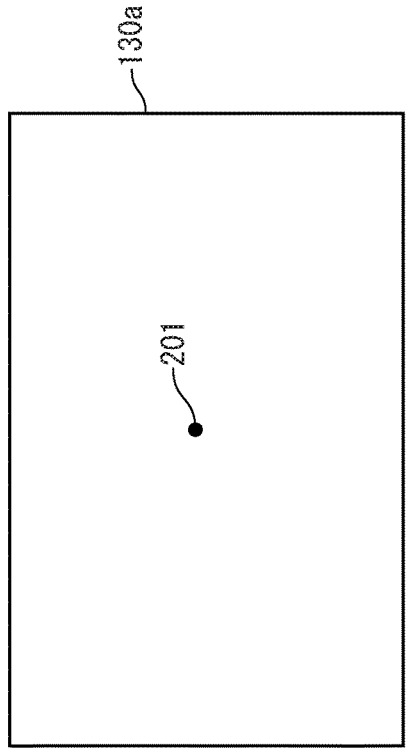
FIG. 2D graphically illustrates detection signals 220-224, 225-229 output from the touch unit 130a when contact is made in two lines (pinch in).
Figure 2E:
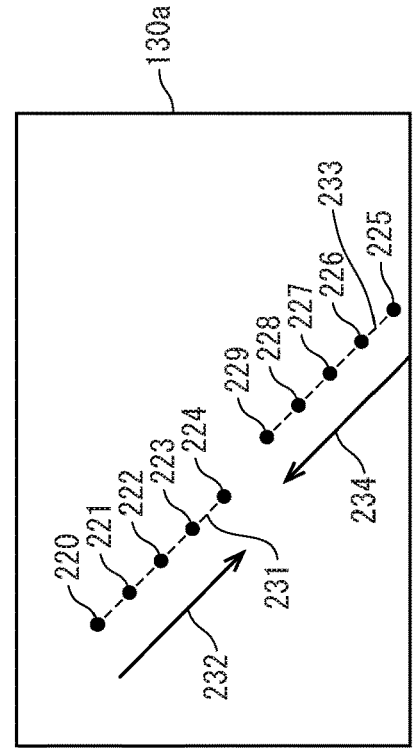
FIG. 2E graphically illustrates detection signals 240-244, 245-249 output from the touch unit 130a when contact is made in two lines (pinch out).

FIG. 2B, 2C, 2D, 2E graphically illustrate detection signals output from the touch unit 130a. FIG. 2B illustrates contact at one point, FIG. 2C illustrates contact made along one line (that is, a swipe), and FIG. 2D, 2E illustrate contact along two lines (that is, a pinch-in or pinch-out).

Here, a swipe means the action of moving one finger in a specific direction while maintaining contact with the touch panel 130a. A pinch-in means the action of moving two fingers closer together while maintaining contact with the touch panel 130a. A pinch-out means the action of moving two fingers farther apart while maintaining contact with the touch panel 130a.

When contact is made at one point, a detection signal 201 is output from the touch unit 130a, as illustrated in FIG. 2B.

When contact is made along one line, detection signals 210-214 are output from the touch unit 130a, as illustrated in FIG. 2C. Arrow 217 indicates a direction in which a user's finger moves, and the detection signals 210-214 form a trajectory 216. Note that the trajectory 216 is just illustrative and the trajectory 216 is not actually acquired. The same is true for FIG. 2D, 2E.

When contact is made along two lines (pinch-in), detection signals 220-224, 225-229 are output from the touch unit 130a, as illustrated in FIG. 2D. Arrows 232, 234 indicate directions in which a user's fingers move, the detection signals 220-224 form a trajectory 231, and the detection signals 225-229 form a trajectory 233.

When contact is made along two lines (pinch-out), detection signals 240-244, 245-249 are output from the touch unit 130a, as illustrated in FIG. 2E. Arrows 252, 254 indicate directions in which a user's fingers move, the detection signals 240-244 form a trajectory 251, and the detection signals 245-249 form a trajectory 253.

The following illustrates specific examples of detection signals output from the touch unit 130a.

Figure 3A:
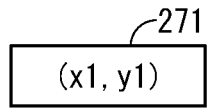
FIG. 3A illustrates a detection signal 271 output from the touch unit 130a when contact is made at one point.

When contact is made at one point, a detection signal 271 is output from the touch unit 130a, as illustrated in FIG. 3A. The detection signal 271 consists of an X coordinate value and a Y coordinate value. X coordinate values and Y coordinate values are also illustrated in FIG. 3B, 3C, 3D.

Figure 3B:
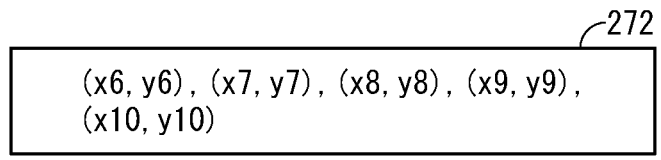
FIG. 3B illustrates an aggregate detection signal 272 output from the touch unit 130a when contact is made in one line (a swipe).

Further, when contact is made along one line, an aggregate detection signal 272 is output from the touch unit 130a, as illustrated in FIG. 3B. The aggregate detection signal 272 as an example consists of five detection signals. Here, arrangement of the five detection signals (sets of X coordinate value and Y coordinate value) in the aggregate detection signal 272 matches the order in which a user's finger contacts the touch unit 130a. The same is true for FIG. 3C, 3D.

Figure 3C:
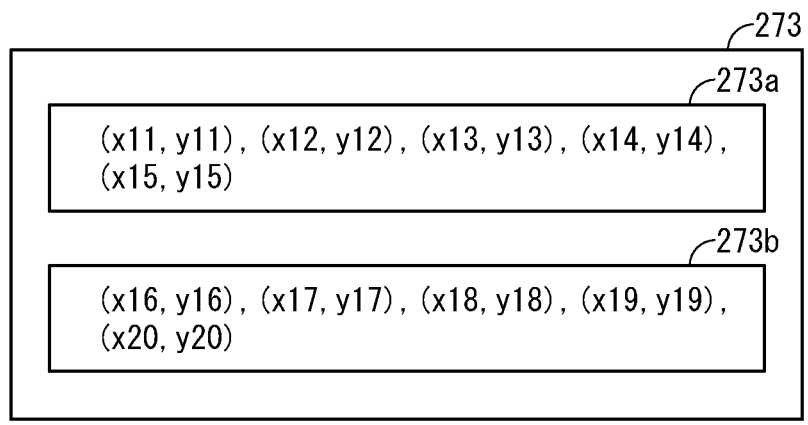
FIG. 3C illustrates an aggregate detection signal 273 output from the touch unit 130a when contact is made in two lines (pinch-in).

Further, when contact is made along two lines (pinch-in), an aggregate detection signal 273 is output from the touch unit 130a, as illustrated in FIG. 3C. The aggregate detection signal 273 includes an aggregate 273a and an aggregate 273b. The aggregates 273a, 273b each correspond to contact along one line.

Figure 3D:
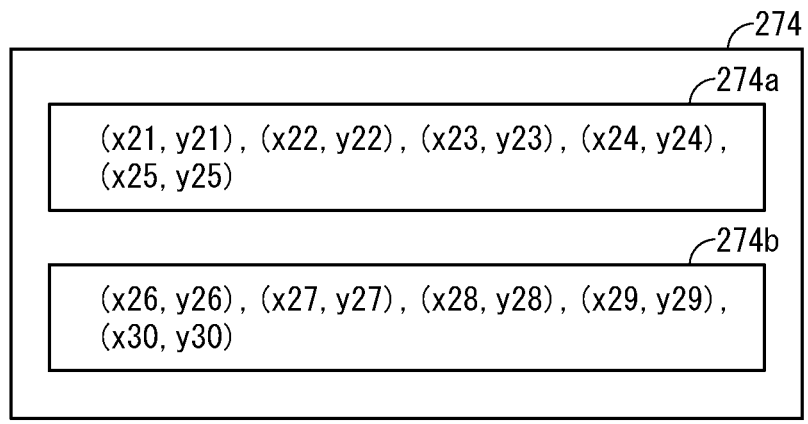
FIG. 3D illustrates an aggregate detection signal 274 output from the touch unit 130a when contact is made in two lines (pinch-out).

Further, when contact is made along two lines (pinch-out), an aggregate detection signal 274 is output from the touch unit 130a, as illustrated in FIG. 3D. The aggregate detection signal 274 includes an aggregate 274a and an aggregate 274b. The aggregates 274a, 274b each correspond to contact along one line.

1.3. Control Circuitry 100

Figure 1B:
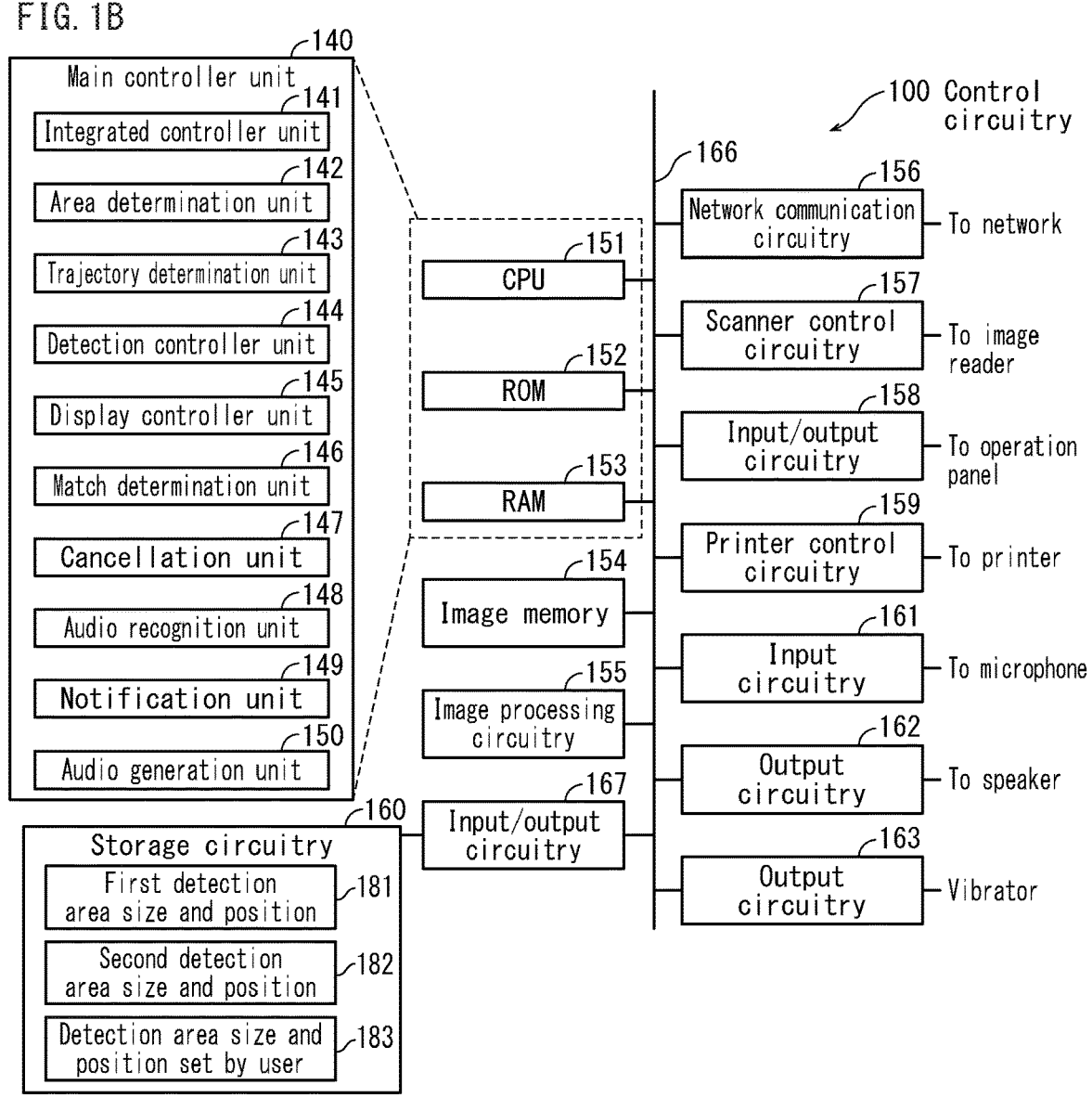
FIG. 1B is a block diagram illustrating structure of control circuitry 100.

As illustrated in FIG. 1B, the control circuitry 100 includes a central processing unit (CPU) 151, read only memory (ROM) 152, random access memory (RAM) 153, image memory 154, image processing circuitry 155, network communication circuitry 156, scanner control circuitry 157, the input/output circuitry 158, printer control circuitry 159, storage circuitry 160, input circuitry 161, output circuitry 162, output circuitry 163, input/output circuitry 167, a bus 166, and the like.

The CPU 151, the ROM 152, the RAM 153, the image memory 154, the image processing circuitry 155, the network communication circuitry 156, the scanner control circuitry 157, the input/output circuitry 158, the printer control circuitry 159, the input circuitry 161, the output circuitry 162, the output circuitry 163, and the input/output circuitry 167 are interconnected via the bus 166. The storage circuitry 160 is connected to the input/output circuitry 167.

The CPU 151, the ROM 152, and the RAM 153 constitute a main controller 140.

The RAM temporarily stores various control variables and data such as a number of copies to be made as set by the operation panel 119, and provides a work area when a program is executed by the CPU 151.

The ROM 152 stores control programs and the like for executing various jobs such as a copy operation. The ROM 152 is a non-transitory computer-readable recording medium. Note that the storage circuitry 160, which is a non-transitory computer-readable recording medium, may store control programs or the like.

The CPU 151 (a hardware processor) operates according to a control program stored in the ROM 152.

The image memory 154 temporarily stores image date includes in a print job or the like.

The image processing circuitry 155 executes data processing on image data of each color component R, G, B, obtained by the image reader 111 for example, and converts image data to reproduction colors Y, M, C, K.

The network communication circuitry 156 receives a print job from an external terminal device via a network. Further, the network communication circuitry 156 transmits email via a network.

The scanner control circuitry 157 controls the image reader 111 to execute a document scanning operation.

The input/output circuitry 158 receives a detection signal from the touch unit 130a and outputs a received detection signal to an area determination unit 142 of the main controller 140, described later. Further, the input/output circuitry 158 receives a frame image from a display control unit 145 of the main controller 140, described later, and outputs a received frame image to the display 130b of the operation panel 119 for display. Here, an image displayed on an entire display surface of the display 130b of the touch panel 130 is referred to as a frame image.

The storage circuitry 160 includes non-volatile semiconductor memory. The storage circuitry 160 may be a hard disk.

The storage circuitry 160 stores in advance, for each frame image displayed on the display surface of the display 130b of the touch panel 130, a size of a first detection area, described later, and its position 181 on X-Y coordinates, and size of a second detection area, described later, and its position 182 on X-Y coordinates. Here, size of the first detection area and its position 181 are predefined for each frame image displayed on the display surface. Further, size of the second detection area and its position 182 are predefined for each frame image. Further, the storage circuitry 160 includes an area for storing size of a detection area set by a user, and its position 183, for each frame image. Here, the second detection area is larger than the first detection area. The first detection area and the second detection area are described later.

The input circuitry 161 is connected to the microphone 115b. The input circuitry 161 converts an analog audio signal received from the microphone 115b into a digital audio signal, and outputs a generated digital audio signal to an audio recognition unit 148 of the main controller 140, described later.

The output circuitry 162 is connected to the speaker 115a. The output circuitry 162 converts a digital audio signal received from an audio generation unit 150 of the main controller 140, described later, into an analog audio signal, and outputs a generated analog audio signal to the speaker 115a.

The output circuitry 163 is connected to a vibrator (not illustrated) included in the image forming device 10. The output circuitry 163 gives an instruction to the vibrator to vibrate under control of a notification unit 149 of the main controller 140, described later.

1.4. Frame Images Displayed on Screen

As examples, frame images displayed on the touch panel 130 of the image forming device 10 are described.

(1) Example of Scrolling by Swiping

The following is a description of scrolling items included in a list by swiping.

Figure 4A:
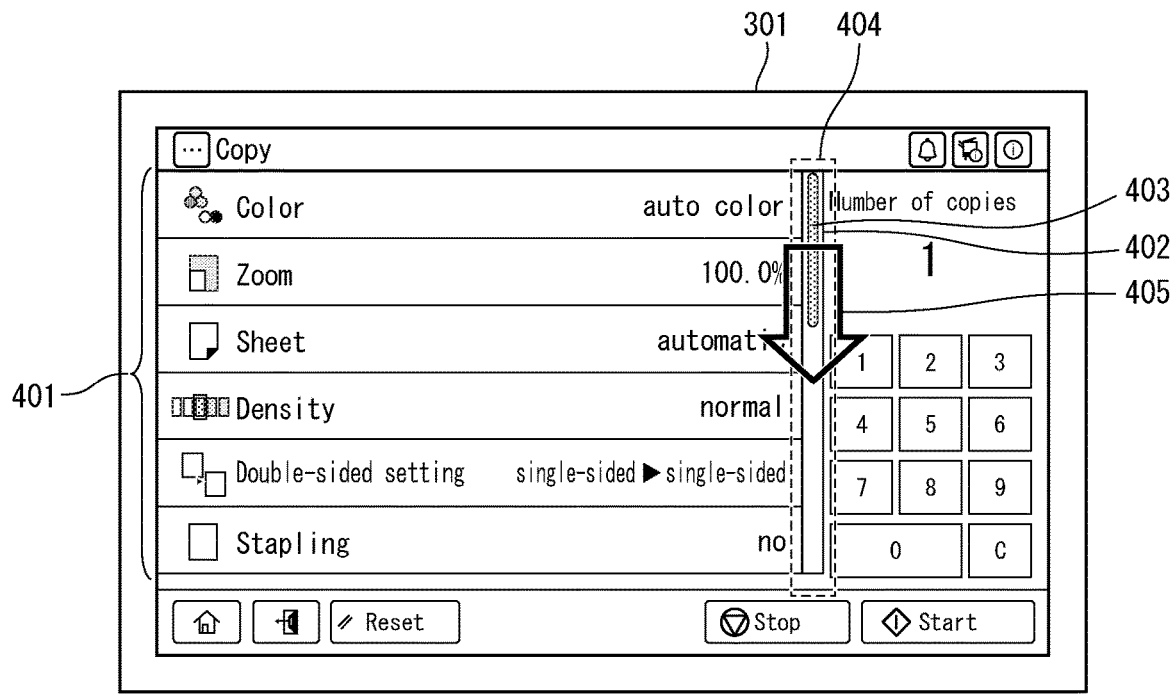
FIG. 4A illustrates a frame image 301 displayed on a display 130b.
Figure 4B:
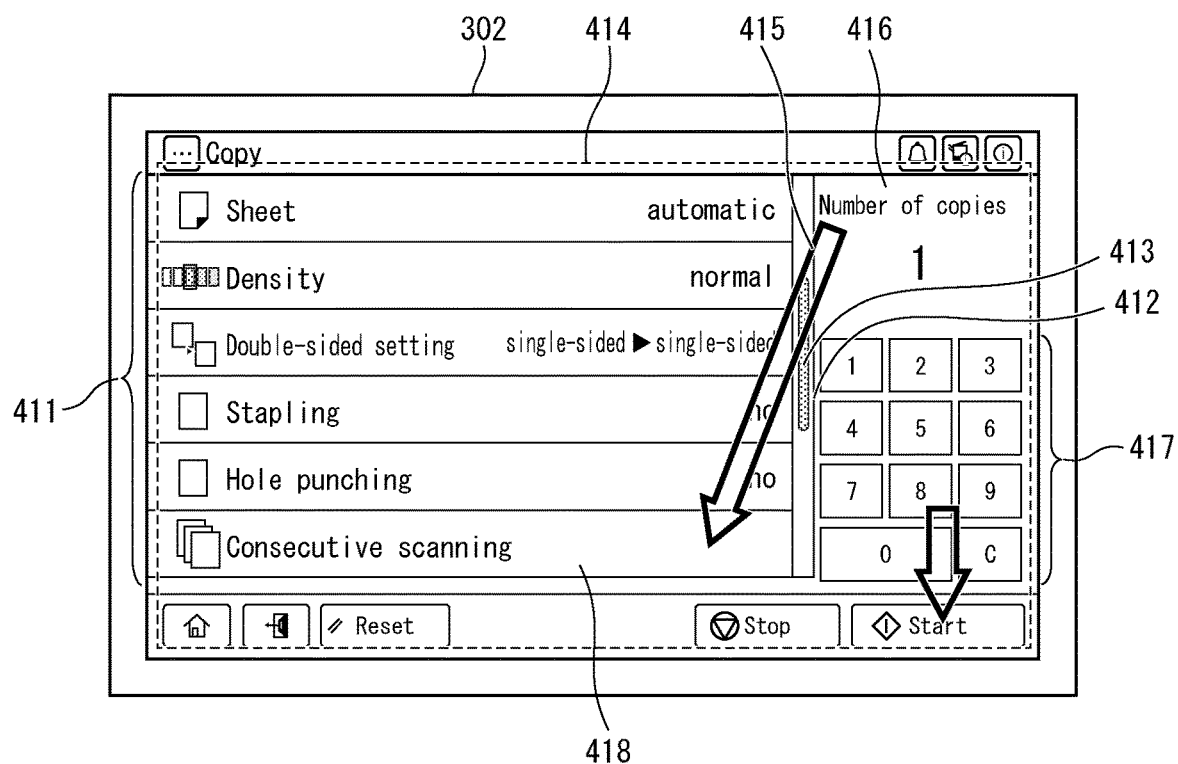
FIG. 4B illustrates a frame image 302 displayed on the display 130b.

A frame image 301 and a frame image 302 illustrated in FIG. 4A and FIG. 4B, respectively, are frame image displayed, for example, when various copy conditions (settings) are set for an MFP before copy execution.

The frame image 301 includes a list 401 of some settings among a large number of settings. As there are many settings, there are some settings that are not displayed in the list 401. In order to display settings not included in the list 401, the frame image 301 includes a long rectangular scroll bar 402 alongside the list 401, and an elevator 403 included in the scroll bar 402.

A detection area 404 is set overlapping the scroll bar 402. When a finger touches the detection area 404, the contact is effective. In FIG. 4A, size of the scroll bar 402 and size of the detection area 404 are different. This is to distinguish each area and make them easier to see in the drawing. In reality, size of the scroll bar 402 and size of the detection area 404 match, and area of the scroll bar 402 coincides with the detection area 404.

Here, the detection area 404 is also referred to as the first detection area. The first detection area is a detection area before enlargement.

In order to display (scroll) settings not included in the list 401, a user moves the elevator 403 in the scroll bar 402 along the direction of the scroll bar 402, which removes some settings included in the list 401 and causes settings previously not included in the list 401 to be displayed in the list 401.

Here, in order to move the elevator 403 in the scroll bar 402, a finger is moved (swiped) in the detection area 404 as indicated by an arrow 405 while the finger is kept in contact with the elevator 403 along the direction of the scroll bar 402.

In this way, by movement of a finger while in contact with the touch panel, the MFP can be made to include and display settings not previously included in the frame image 301. As a result, a user can set conditions for the newly displayed settings.

The frame image 302 illustrated in FIG. 4B is displayed after a user moves their finger while keeping their finger in contact with the elevator 403 as described above.

The frame image 302 includes a list 411 that includes some settings different from those of the list 401 of the frame image 301. Using the frame image 302, a user can set conditions for the newly displayed settings.

Here, in the frame image 301, the detection area 404 coincides with the area of the scroll bar 402. On the other hand, in the frame image 302, the detection area 414 has a size that covers the list 411, the scroll bar 412, a number of copies display area 416, a ten key area 417, and the like, and coincides with these areas. That is, the detection area 414 is enlarged from the detection area 404 illustrated in FIG. 4A. The ten key area 417 is an area for receiving input for the number of copies, a received number is set as the number of copies, and the number is displayed in the number of copies display area 416.

Here, the detection area 414 is also referred to as the second detection area. The second detection area is an enlarged detection area.

Size and position of the second detection area are predefined for each frame image displayed onscreen. Further, size and position of the second detection area may be set by user input. Further, size and position of the second detection area may be set differently per user.

In this way, a swipe can be performed within the enlarged detection area 414. If the detection area 404 prior to enlargement were used, the start point of the swipe may be outside the detection area or the end point of the swipe may be outside the detection area, making the swipe invalid. However, the detection area is enlarged, preventing the swipe from being made invalid.

A swipe indicated by an arrow 415 illustrated in the frame image 302 is valid even though the start point is in the number of copies display area 416 and the end point is in a stapling setting area 418, and therefore causes the list 411 to be scrolled.

(2) Example of Enlarging/Reducing Preview Image by Pinch-In/Pinch-Out

The following describes an example in which a preview image or the like is enlarged or reduced by pinch-in or pinch-out, with reference to FIG. 5, 6A, 6B, 6C, 7A, 7B, 7C.

(a) Frame Image 303

Figure 5:
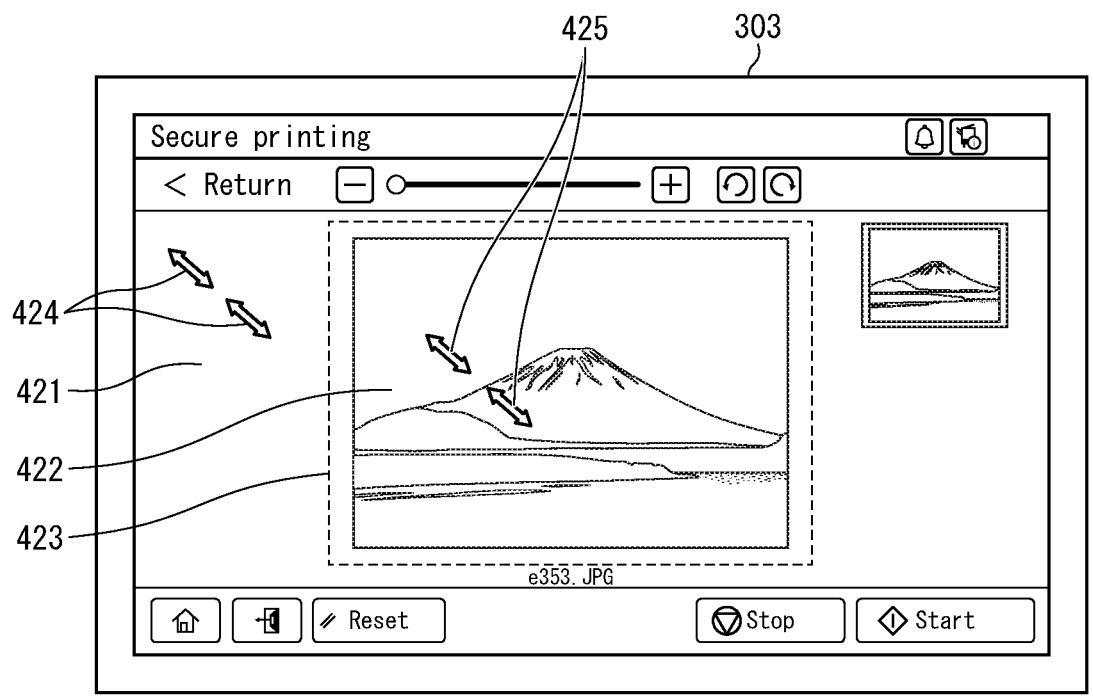
FIG. 5 illustrates a frame image 303 displayed on the display 130b.

As an example, in a frame image 303 illustrated in FIG. 5, a preview image 422 obtained by reducing an image to be printed is arranged in a center of a background image 421 in order to confirm content of the image to be printed.

A detection area 423 is set relative to the preview image 422. In FIG. 5, size of the preview image 422 and size of the detection area 423 are different. This is to distinguish the areas and make for easy viewing of the drawing. In reality, size of the preview image 422 and size of the detection area 423 match, and area of the preview image 422 coincides with the detection area 423.

Here, the detection area 423 is also referred to as the first detection area. The first detection area is a detection area before enlargement.

Within the detection area 423, a pinch-in or pinch-out 425 is received. Further, a pinch-in or pinch-out 424 is also received in an area outside the detection area 423 (area of the background image 421 excluding the preview image 422).

Within the detection area 423, when a pinch-in or pinch-out 425 is received, the preview image 422 is reduced or enlarged, respectively. Further, outside the detection area 423, when a pinch-in or pinch-out 424 is received, the background image 421 is reduced or enlarged, respectively.

(b) Pinch-In or Pinch-Out within Detection Area 423

The following describes a case where a pinch-in or pinch-out is received in the detection area 423.

(Frame Image 304)

Figure 6A:
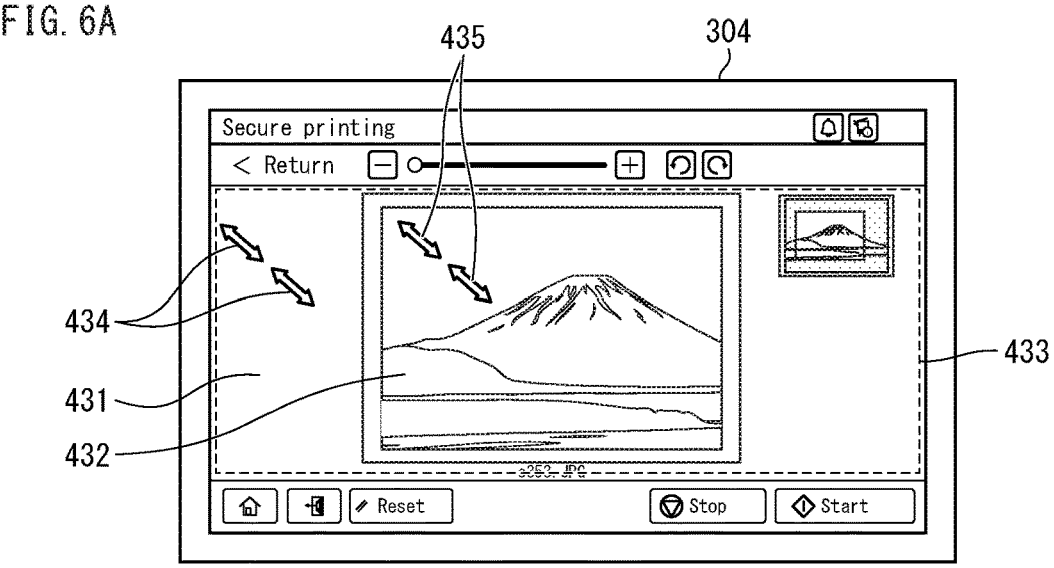
FIG. 6A illustrates a frame image 304 displayed on the display 130b.

Within the detection area 423, when a pinch-out 425 is received, the preview image 422 is enlarged. FIG. 6A illustrates a frame image 304 after enlargement of the preview image 422.

The frame image 304 includes a preview image 432 obtained by enlarging the preview image 422. In the frame image 304, the detection area 423 is enlarged to become a detection area 433. Size of the detection area 433 is the same as size of the background image 431, and the detection area 433 coincides with area of the background image 431.

Here, the detection area 433 is also referred to as the second detection area. The second detection area is an enlarged detection area.

When a pinch-out or pinch-in is received in the detection area 433, the preview image 432 is enlarged or reduced. The detection area is enlarged, and therefore if within the detection area 433, whether a pinch-out or pinch-in 435 is received inside the preview image 432 or a pinch-out or pinch-in 434 is received outside the preview image 432, the preview image 432 is enlarged or reduced.

(Frame Image 305)

Figure 6B:
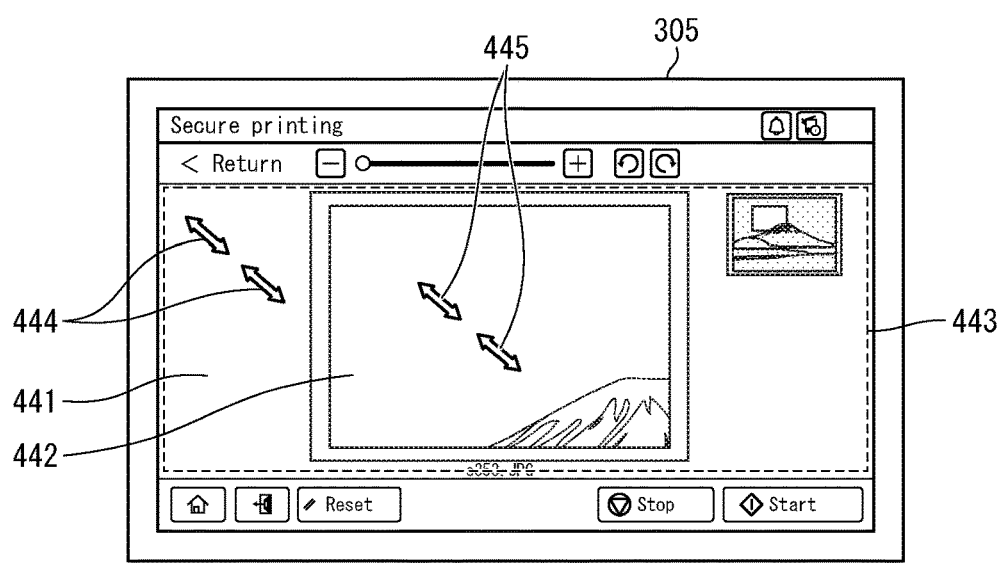
FIG. 6B illustrates a frame image 305 displayed on the display 130b.

Within the detection area 433, when a pinch-out 435 is received, the preview image 432 is enlarged. FIG. 6B illustrates a frame image 305 after enlargement of the preview image 432.

The frame image 305 includes a preview image 442 obtained by enlarging the preview image 432. The detection area 443 in the frame image 305 and the detection area 433 in the frame image 304 have the same size. The detection area 443 coincides with the area of the background image 441.

When a pinch-out or pinch-in is received in the detection area 443, the preview image 442 is enlarged or reduced. If within the detection area 443, whether a pinch-out or pinch-in 445 is received inside the preview image 442 or a pinch-out or pinch-in 444 is received outside the preview image 442, the preview image 442 is enlarged or reduced.

(Frame Image 306)

Figure 6C:
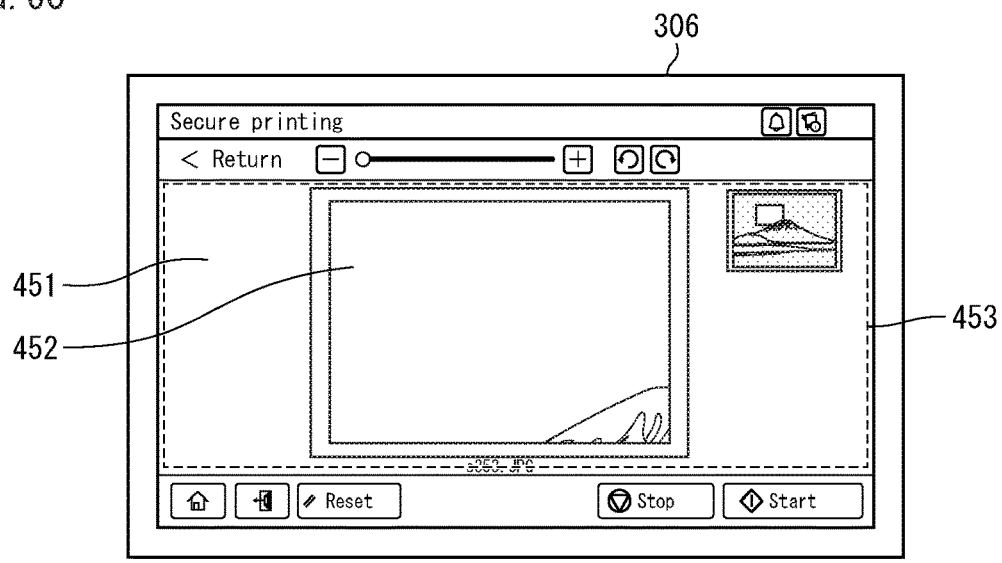
FIG. 6C illustrates a frame image 306 displayed on the display 130b.

Within the detection area 443, when a pinch-out 445 is received, the preview image 442 is enlarged. FIG. 6C illustrates a frame image 306 after enlargement of the preview image 442.

The frame image 306 includes a preview image 452 obtained by enlarging the preview image 442. The detection area 453 in the frame image 306 and the detection area 443 in the frame image 305 have the same size. The detection area 453 coincides with the area of the background image 451.

When a pinch-out or pinch-in is received in the detection area 453, the preview image 452 is enlarged or reduced.

(c) Pinch-In or Pinch-Out Outside Detection Area 423

The following describes a case where a pinch-in or pinch-out is received outside the detection area 423 illustrated in FIG. 5.

(Frame Image 307)

Figure 7A:
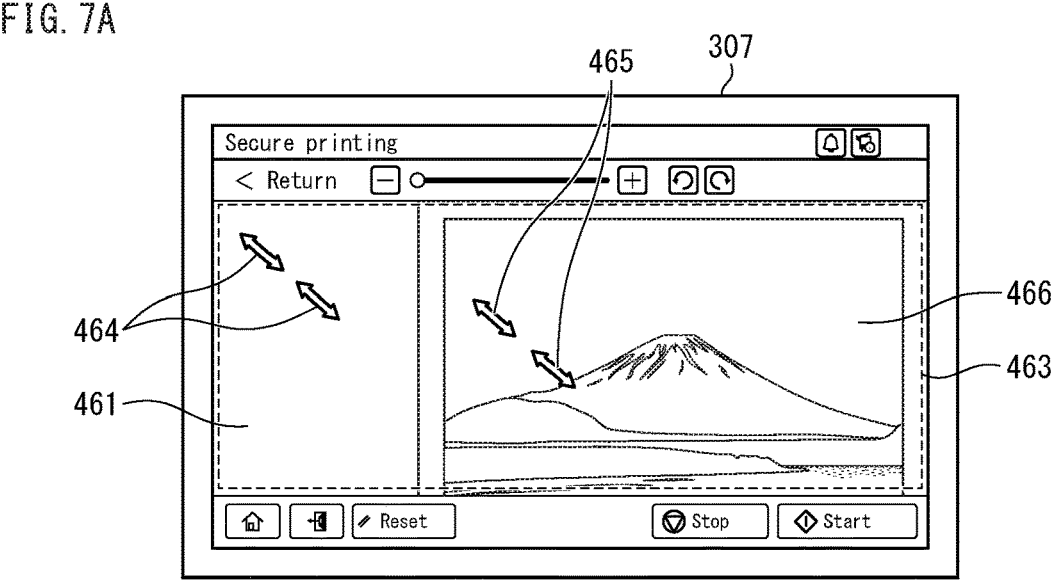
FIG. 7A illustrates a frame image 307 displayed on the display 130b.

When a pinch-out 424 is received outside the detection area 423 illustrated in FIG. 5, the background image 421 is enlarged. FIG. 7A illustrates a frame image 307 after enlargement of the background image 421.

The frame image 307 includes a background image 461 obtained by enlarging the background image 421 illustrated in FIG. 5. In the frame image 307, the detection area 423 illustrated in FIG. 5 is enlarged to become a detection area 463. Size of the detection area 463 is the same as size of the background image 461, and the detection area 463 coincides with the area of the background image 461.

Here, the detection area 463 is also referred to as the second detection area. The second detection area is an enlarged detection area.

When a pinch-out or pinch-in is received in the detection area 463, the background image 461 is enlarged or reduced. The detection area is enlarged, and therefore if within the detection area 463, whether a pinch-out or pinch-in 465 is received inside the preview image 466 or a pinch-out or pinch-in 464 is received outside the preview image 466, the background image 461 is enlarged or reduced.

(Frame Image 308)

Figure 7B:
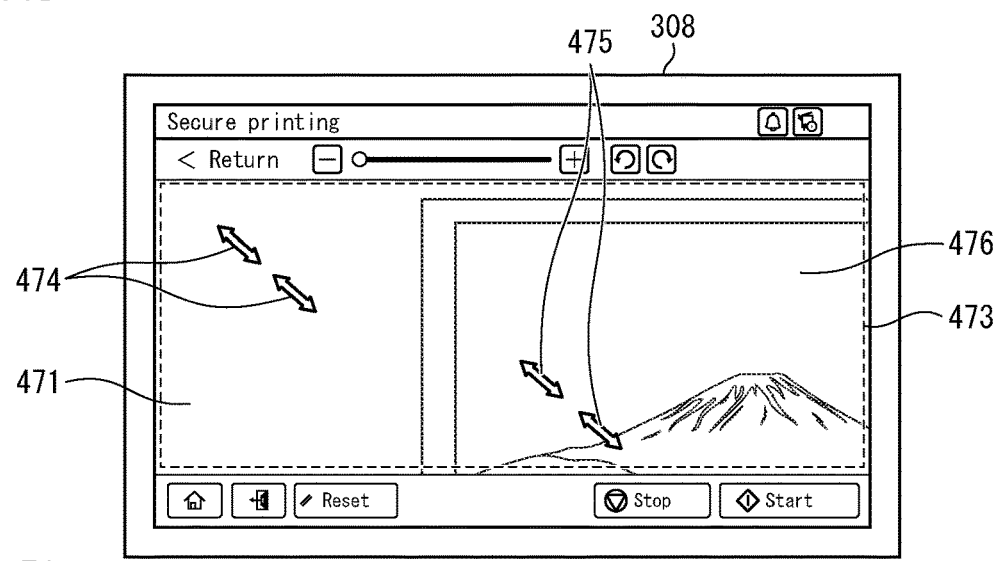
FIG. 7B illustrates a frame image 308 displayed on the display 130b.

Within the detection area 463, when a pinch-out 465 is received, the background image 461 is enlarged. FIG. 7B illustrates a frame image 308 after enlargement of the background image 461.

The frame image 308 includes a background image 471 obtained by enlarging the background image 461. The detection area 463 in the frame image 307 and the detection area 473 in the frame image 308 have the same size. The detection area 473 coincides with the area of the background image 471.

When a pinch-out or pinch-in is received in the detection area 473, the background image 471 is enlarged or reduced. If within the detection area 473, whether a pinch-out or pinch-in 475 is received inside the preview image 476 or a pinch-out or pinch-in 474 is received outside the preview image 476, the background image 471 is enlarged or reduced.

(Frame Image 309)

Figure 7C:
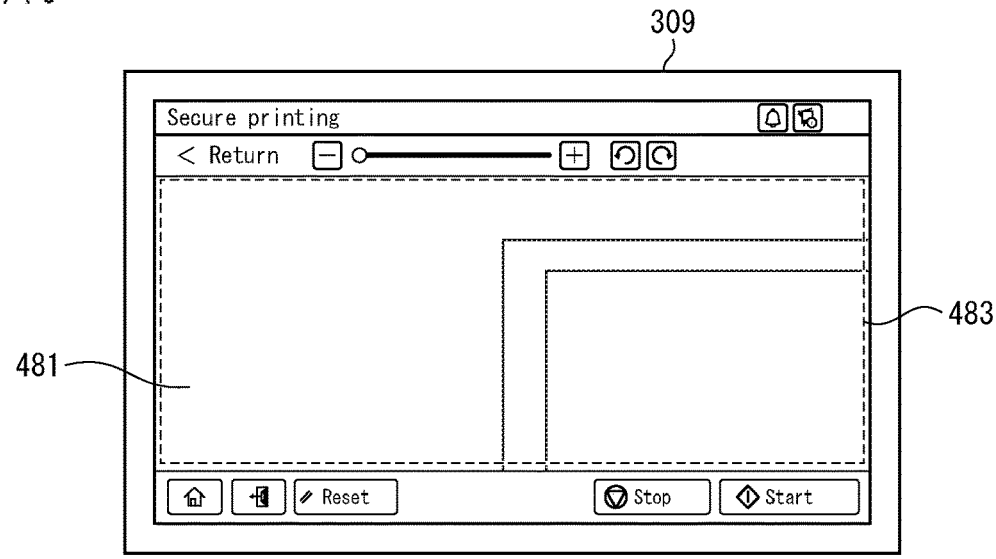
FIG. 7C illustrates a frame image 309 displayed on the display 130b.

Within the detection area 473, when a pinch-out 475 is received, the background image 471 is enlarged. FIG. 7C illustrates a frame image 309 after enlargement of the background image 471.

The frame image 309 includes a background image 481 obtained by enlarging the background image 471. The detection area 483 in the frame image 309 and the detection area 473 in the frame image 308 have the same size. The detection area 483 coincides with the area of the background image 481.

When a pinch-out or pinch-in is received in the detection area 483, the background image 481 is enlarged or reduced.

(3) Detection Area and Display Area

The following is a description of a relationship between a maximum display area of the display 130*b* of the touch panel 130 and a maximum detection area of the touch unit 130*a*.

Generally, size and position of the maximum display area of the display 130*b* coincides with size and position of the maximum detection area of the touch unit 130*a*.

However, the relationship is not limited to this.

Figure 8A:
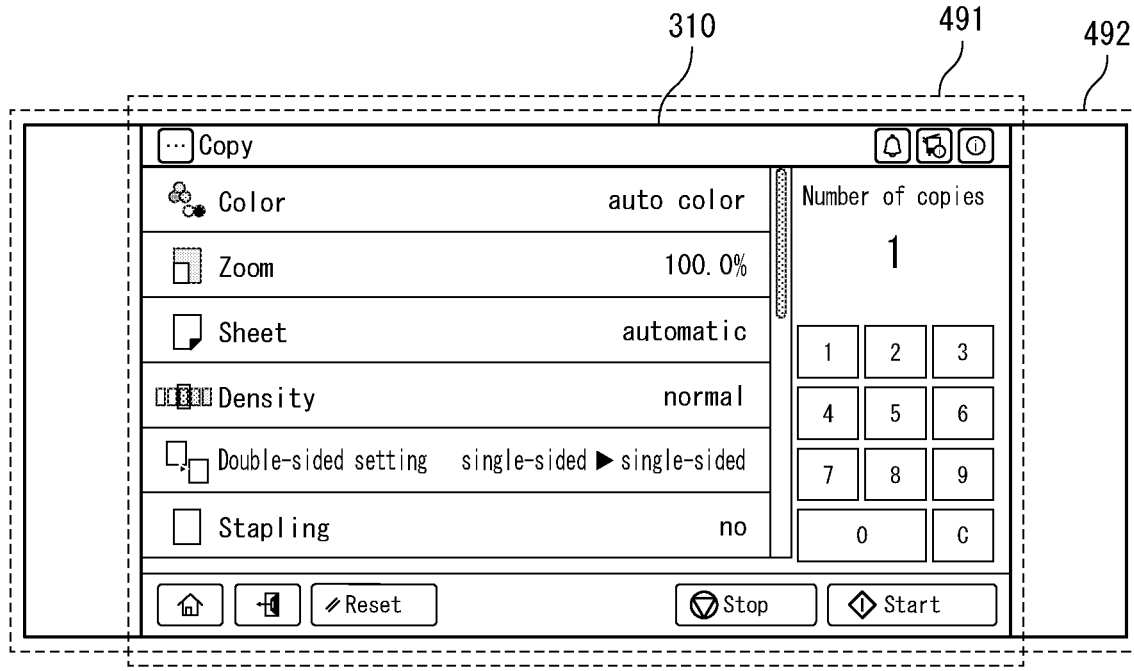
FIG. 8A illustrates a frame image 310 displayed on the display 130b.

As illustrated in FIG. 8A, a detection area 492 may include a display area 491. That is, size of the detection area 492 is greater than size of the display area 491.

Figure 8B:
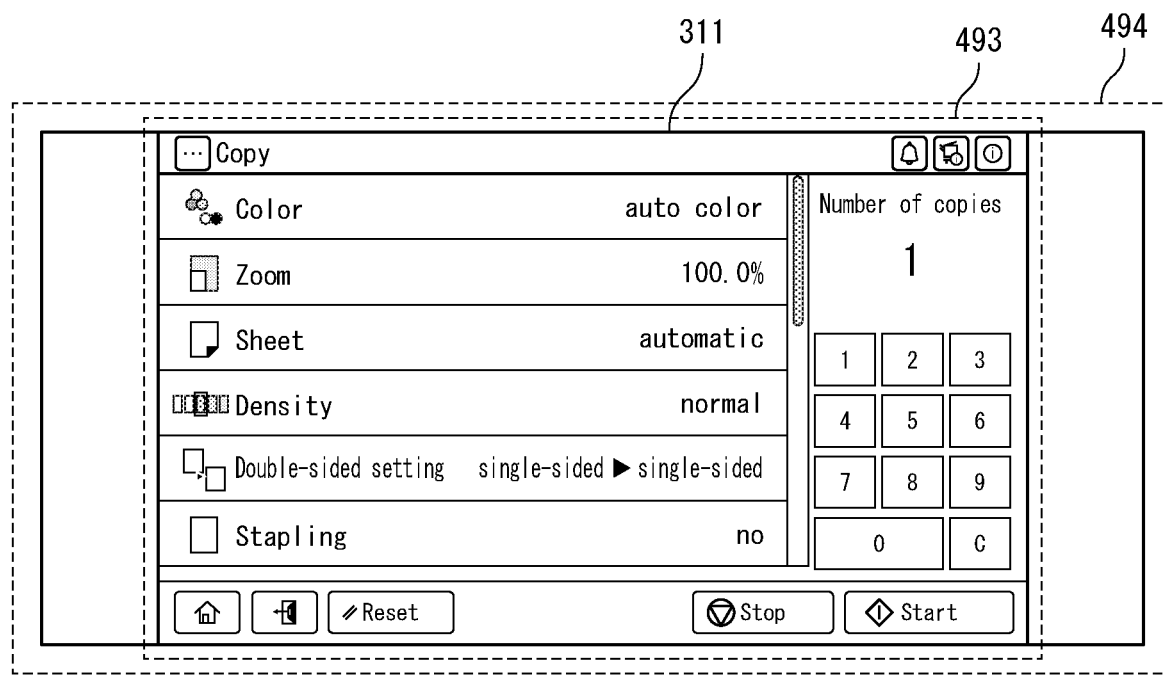
FIG. 8B illustrates a frame image 311 displayed on the display 130b.

Further, as illustrated in FIG. 8B, a display area 494 may include a detection area 493. That is, size of the display area 494 is greater than size of the detection area 493.

Further, size of the first detection area is smaller than size of the second detection area, and is smaller than size of the maximum detection area. Further, size of the second detection area is smaller than or equal to size of the maximum detection area.

(4) Area Excluded from Detection Area

An area may be set that is excluded from a detection area for detection of swipe, pinch-in, and pinch-out operations.

Figure 9:
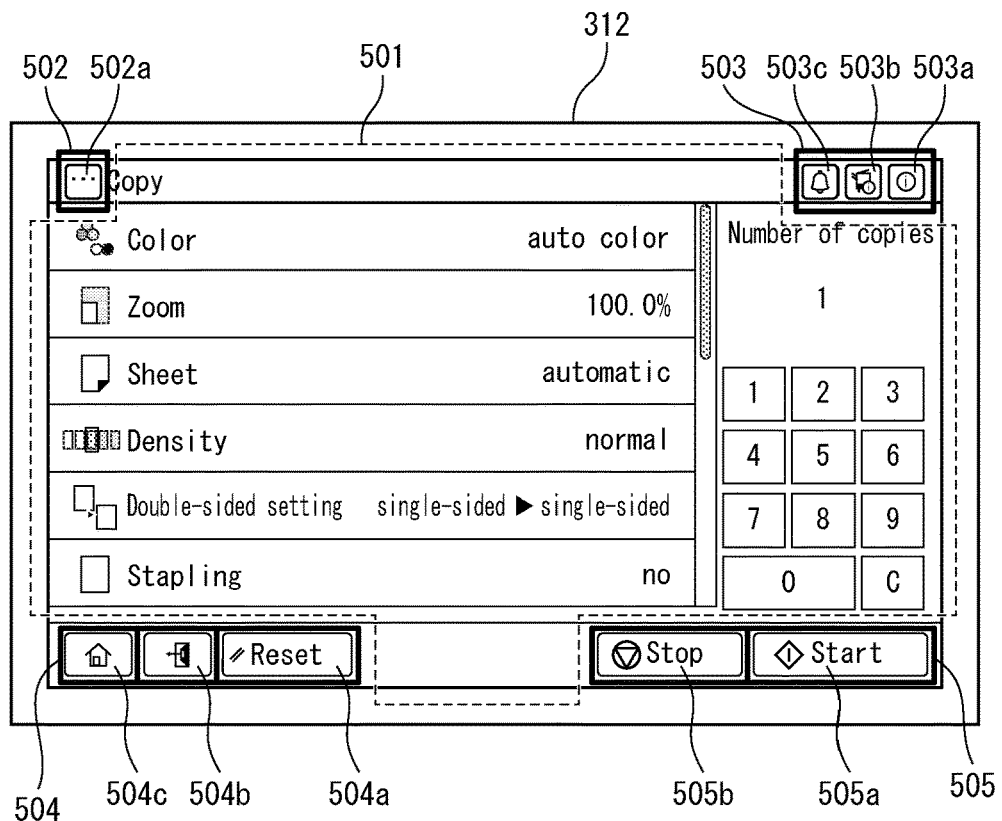
FIG. 9 illustrates a frame image 312 displayed on the display 130b.

A frame image 312 illustrated in FIG. 9 includes specific icon images for instructions to execute specific operations of the image forming device 10.

For example, an icon image 505*a* instructs that a job be started, an icon image 505*b* instructs that a running job be stopped, an icon image 504*a* instructs that settings be restored to initial values, an icon image 504*b* instructs that a user be logged out, an icon image 504*c* instructs that display transitions to a home screen, an icon image 503*a* is for displaying help information, an icon image 503*b* is for displaying a remaining amount of a consumable, an icon image 503*c* is for displaying error details, and an icon image 502*a* is for displaying a variety of information.

Here, the icon image 505*a* and the icon image 505*b* are arranged in an area 505. Further, the icon image 504*a*, the icon image 504*b*, and the icon image 504*c* are arranged in an area 504. Further, the icon image 503*a*, the icon image 503*b*, and the icon image 503*c* are arranged in an area 503. Further, the icon image 502*a* is in an area 502.

Each of these icon images is for performing a corresponding specific operation, and may have a higher priority than operations such as swipe, pinch-in, and pinch-out.

Accordingly, a remaining area may be set as a detection area 501, excluding the areas 502, 503, 504, 505 in which the icon images are arranged from the maximum detection area.

In the detection area 501, a detection area before enlargement (first detection area), as mentioned above, and a detection area after enlargement (second detection area), as mentioned above, are set.

(5) First Detection Signal and Second and Subsequent Detection Signals

Figure 10:
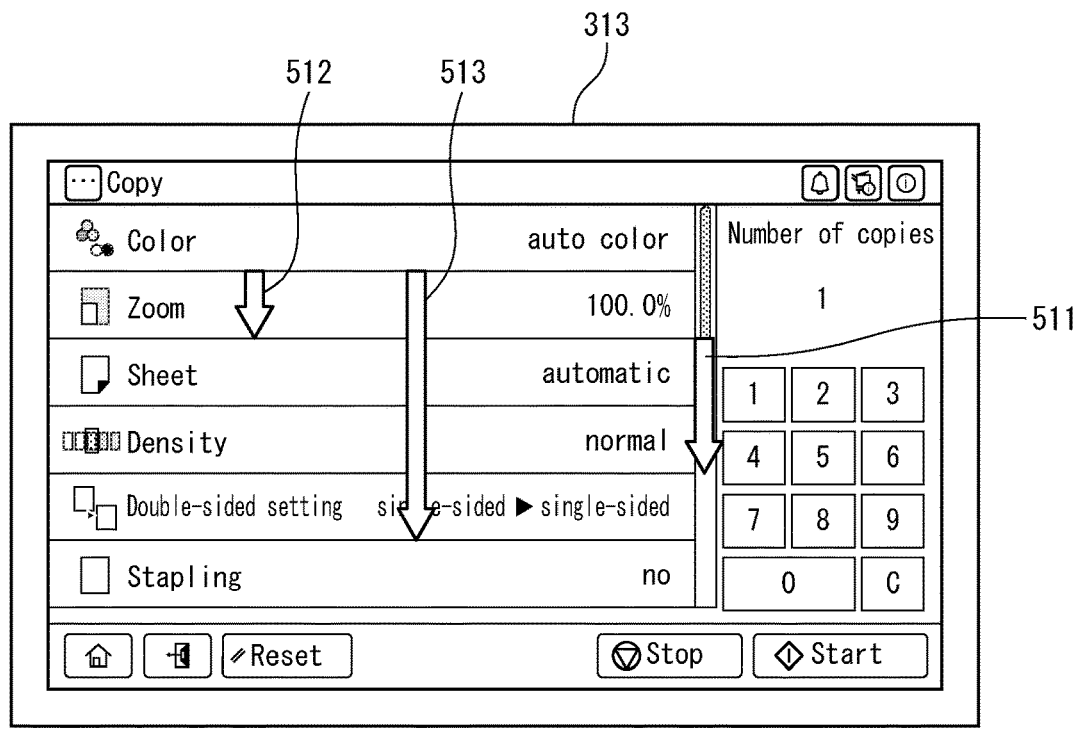
FIG. 10 illustrates a frame image 313 displayed on the display 130b.

A frame image 313 illustrated in FIG. 10 shows a case where scrolling is performed by swiping.

Here, as described later, a detection signal first received after transition under control of an integrated control unit 141 from a frame image displayed on a display surface of the display 130*b* to another frame image can also be referred to as a first detection signal. Further, detection signals received a second and subsequent time after receiving the first detection signal can also be referred to as second and subsequent detection signals. After receiving second and subsequent detection signals, when an enlarged detection area is cancelled and an original detection area is restored, as described above, a detection signal subsequently received for the first time is called a first detection signal, and detection signals received after the first detection signal are called second and subsequent detection signals. Swipes, pinch-outs, and pinch-ins are also referred to as a first swipe, first pinch-out, first pinch-in, second and subsequent swipes, second and subsequent pinch-outs, and second and subsequent pinch-ins.

An amount of screen scrolling may be altered according to length of second and subsequent swipes, based on length of the first swipe.

That is, an amount of screen scrolling may be altered according length of trajectories according to second and subsequent detection signals, based on length of a trajectory of the first detection signal.

In the frame image 313 illustrated in FIG. 10, an arrow 511 indicates a trajectory of the first detection signal, an arrow 512 indicates a trajectory of a second detection signal, and an arrow 513 indicates a trajectory of a third detection signal.

If a length of the trajectory of the first detection signal is "1" and length of the trajectory of the second detection signal is "0.5", a scroll amount is halved from a first scroll amount.

Further, if a length of the trajectory of the first detection signal is "1" and length of the trajectory of the third detection signal is "3.0", a scroll amount is tripled from a first scroll amount.

Accordingly, scroll amounts for second and subsequent swipes can be determined according to lengths of trajectories of second and subsequent detection signals.

(6) Example of Cancelling Enlarged Detection Area

The following describes an example of cancelling an enlarged detection area.

Figure 11:
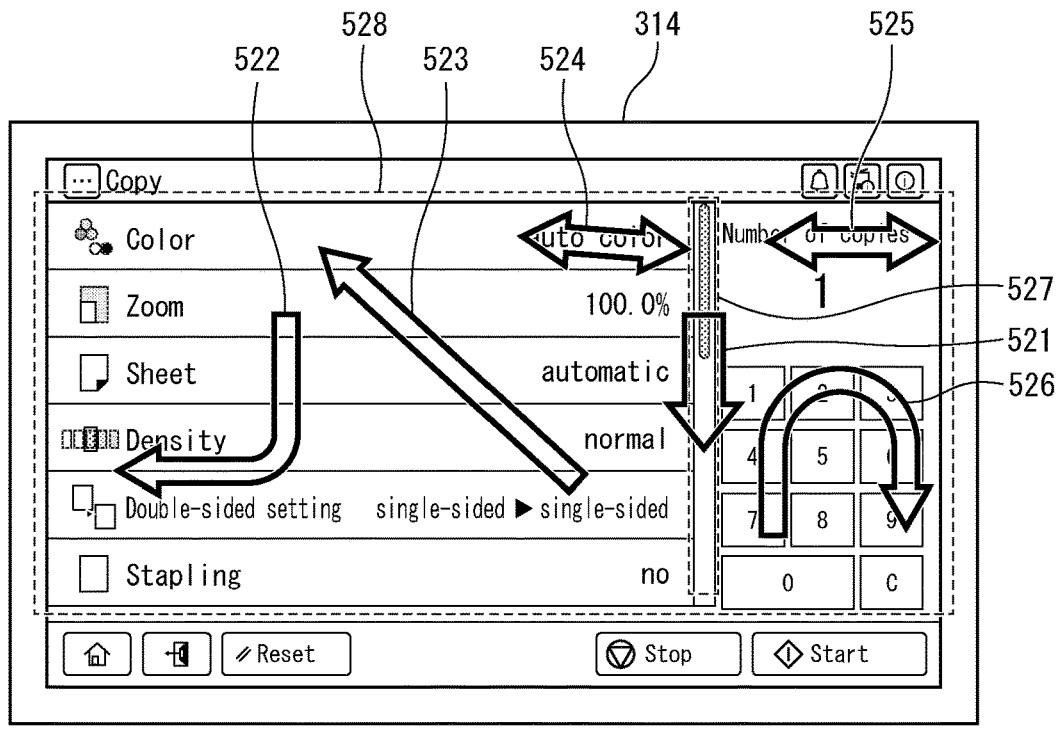
FIG. 11 illustrates a frame image 314 displayed on the display 130b.

In a frame image 314 illustrated in FIG. 11, a list is displayed, and displayed list items are scrolled vertically. Further, in the frame image 314, a first swipe 521 and second and subsequent touch operations 522-526 that draw linear trajectories are indicated.

As described above, after the swipe 521 in a detection area 527, scrolling occurs and the detection area 527 enlarges to become a detection area 528.

Subsequently, second and subsequent touch operations are possible in the detection area 528.

Here, in second and subsequent touch operations, when a touch operation describes a bent L shape as in touch operation 522, the touch operation is not a swipe, and therefore the enlarged detection area 528 is cancelled and the detection area 527 is restored. Subsequent detection is performed in the detection area 527.

Further, in second and subsequent touch operations, when a touch operation describes a diagonal straight line with a large amount of movement in a scroll direction as in touch operation 523, the touch operation is a swipe, and therefore the enlarged detection area 528 is maintained.

Further, in second and subsequent touch operations, when a touch operation describes a straight line with a small amount of movement in a scroll direction as in touch operations 524, 525, these touch operations are not swipes, and therefore the enlarged detection area 528 is cancelled and the detection area 527 is restored. Subsequent detection is performed in the detection area 527.

Further, in second and subsequent touch operations, when a touch operation describes a bent U shape as in touch operation 526, the touch operation is not a swipe, and therefore the enlarged detection area 528 is cancelled and the detection area 527 is restored. Subsequent detection is performed in the detection area 527.

As described above, when the first touch operation is a swipe, the detection area is enlarged to receive second and subsequent touch operations. When second and subsequent touch operations are also swipes, the enlarged detection area is maintained. On the other hand, when second and subsequent touch operations are different touch operations from the first swipe, the enlarged detection area is cancelled and the original detection area is restored.

In this way, when second and subsequent touch operations are also swipes, the enlarged detection area is maintained. In such a case, it is highly possible that a third touch operation is also a swipe, and therefore operability of the third touch operation can be maintained by maintaining the enlarged detection area.

Swiping is not the only way to maintain an enlarged detection area.

When second and subsequent touch operations are pinch-in or pinch-out, the same as the first touch operation, the enlarged detection area is maintained. Here, pinch-in and pinch-out are considered to be the same type of touch operation.

(7) Another Example of Cancelling Enlarged Detection Area

The following describes another example of cancelling an enlarged detection area.

Figure 12:
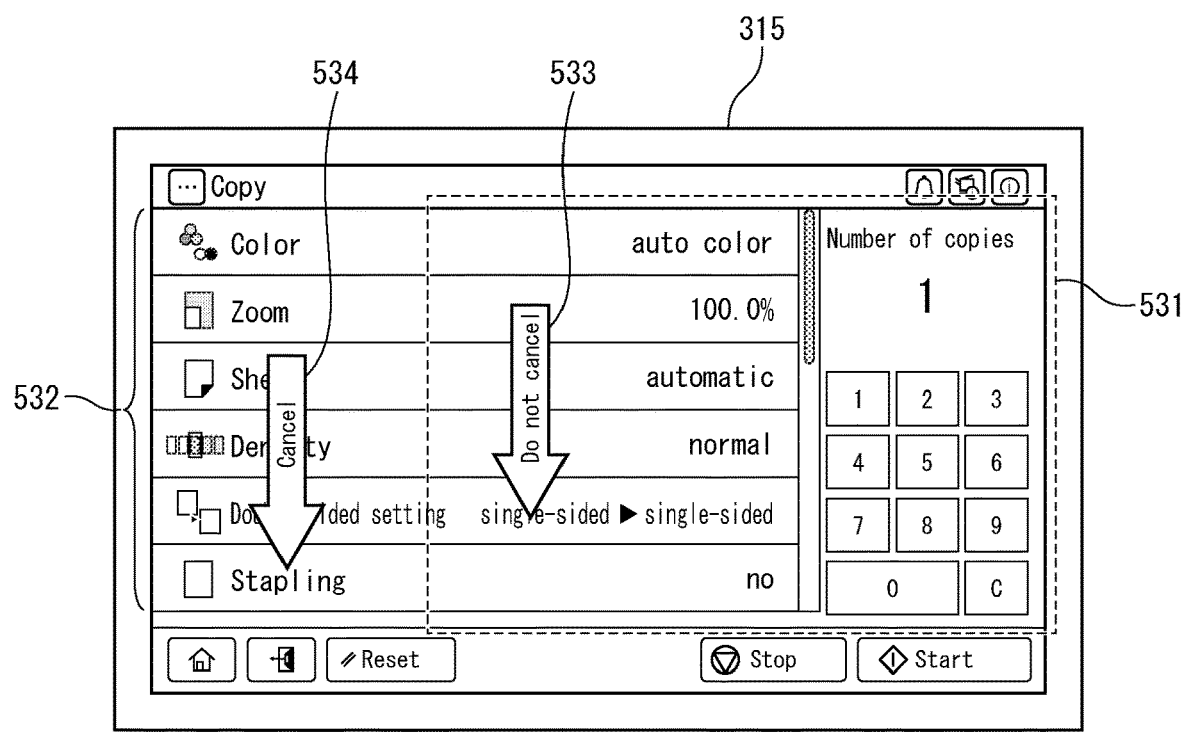
FIG. 12 illustrates a frame image 315 displayed on the display 130b.

In a frame image 315 illustrated in FIG. 12, a list 532 is displayed, and displayed list items are scrolled vertically. Further, in the frame image 315, an enlarged detection area 531 is set after the first swipe is completed.

Here, when a swipe 533 is performed in the detection area 531, items in the list 532 are scrolled vertically as described above. Further, the detection area 531 is maintained.

On the other hand, when a swipe 534 is performed outside the detection area 531, the detection area 531 is cancelled and the original detection area is restored. Further, when pinch-in or pinch-out is performed outside the detection area 531, the detection area 531 is cancelled and the original detection area is restored.

As described above, when a touch operation is performed in an area outside the enlarged detection area, the detection area is cancelled and the original detection area is restored.

(8) Display During Repeated Input

As described above, when second and subsequent touch operations are the same type of touch operation as the first touch operation, the enlarged detection area is maintained. In this way, repeated input of the same type of touch operation is allowed.

Figure 13:
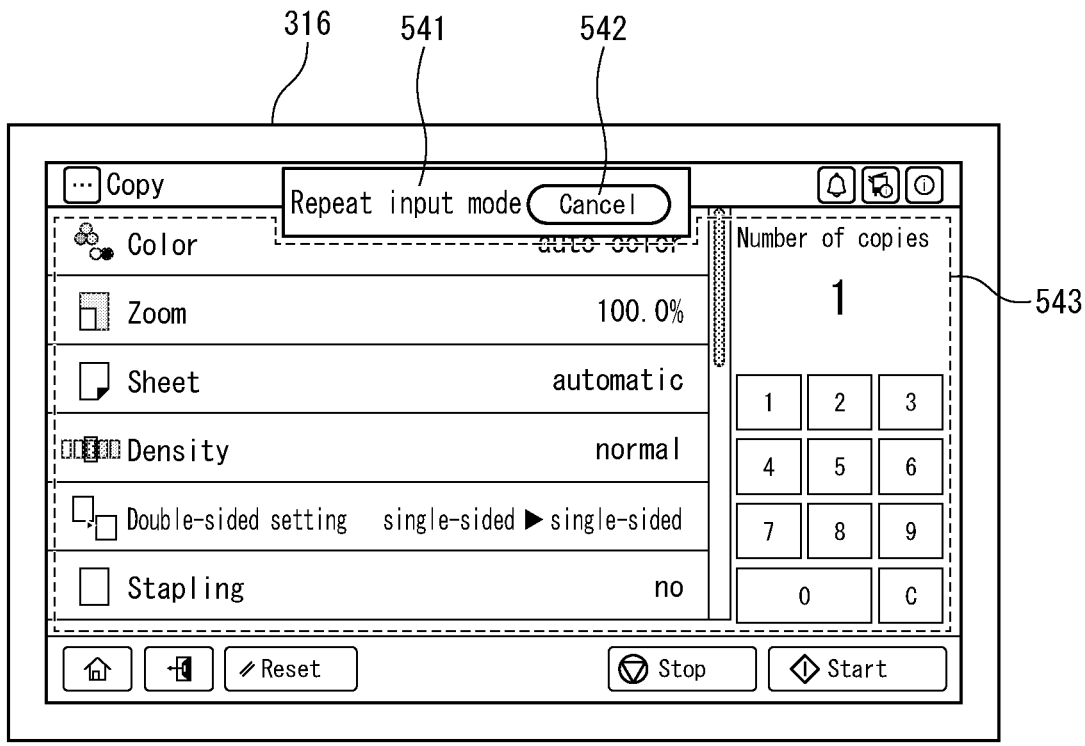
FIG. 13 illustrates a frame image 316 displayed on the display 130b.

In a frame image 316 illustrated in FIG. 13, a message indicating that repeated input of the same touch operation is allowed is displayed in a message area 541. Further, the message area 541 includes an icon image 542 for cancelling an enlarged detection area 543. When a touch operation is detected at a coordinate corresponding to the icon image 542, the enlarged detection area 543 is cancelled and an original detection area is restored.

Here, in the frame image 316, the message area 541 including the icon image 542 is excluded from a detection area 543 as set.

Through visual recognition of the message in the message area 541, a user can understand that repeated input of the same touch operation is currently allowed.

(9) Detection Area Highlighting

Ranges of detection areas or the like may be highlighted.

Figure 14:
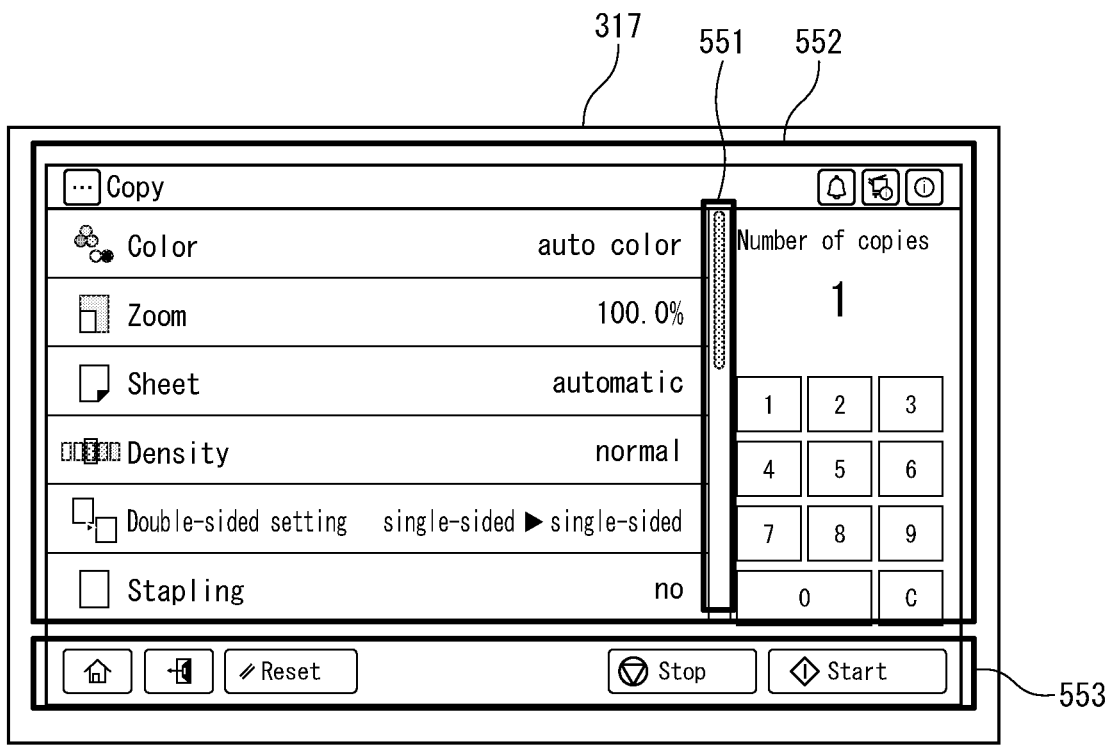
FIG. 14 illustrates a frame image 317 displayed on the display 130b.

A frame image 317 illustrated in FIG. 14 shows a detection area 551 before enlargement, a detection area 552 after enlargement, and an invalid area 553 excluded from a detection area. The invalid area 553 is an area that does not accept the touch operations of swipe, pinch-in, or pinch-out.

In the frame image 317, each area is surrounded by a thick border line in order to emphasize the detection area 551, the detection area 552, and the invalid area 553.

Color of border lines surrounding each area may be different for each area. Further, border lines surrounding each area may blink on and off for each area. Further, hatching of different colors may be applied to each area. In these ways, each area may be emphasized.

In the frame image 317, the detection area 551 and the detection area 552 are not indicated to be set at the same time, and the drawing is just illustrating emphasizing both areas.

1.5. Main Controller 140

As illustrated in FIG. 1B, the CPU 151 operates according to a control program, and therefore the main controller 140 includes the integrated control unit 141, the area determination unit 142, a trajectory determination unit 143, a detection control unit 144, the display control unit 145, a match determination unit 146, a cancellation unit 147, the audio recognition unit 148, the notification unit 149, and the audio generation unit 150.

Here, the CPU 151, the ROM 152, the RAM 153, the input/output circuitry 158, the storage circuitry 160, the input circuitry 161, the output circuitry 162, the output circuitry 163, the input/output circuitry 167, the bus 166, the operation panel 119, the integrated control unit 141, the area determination unit 142, the trajectory determination unit 143, the detection control unit 144, the display control unit 145, the match determination unit 146, the cancellation unit 147, the audio recognition unit 148, the notification unit 149, and the audio generation unit 150 constitute an input device.

(1) Integrated Control Unit 141

When the CPU 151 operates according to the control program, the integrated control unit 141 coordinates control of the image memory 154, the image processing circuitry 155, the network communication circuitry 156, the scanner control circuitry 157, the input/output circuitry 158, the printer control circuitry 159, the input circuitry 161, the output circuitry 162, the input/output circuitry 167, the output circuitry 163, and the like. Further, the integrated control unit 141 coordinates control of the area determination unit 142, the trajectory determination unit 143, the detection control unit 144, the display control unit 145, the match determination unit 146, the cancellation unit 147, the audio recognition unit 148, the notification unit 149, and the audio generation unit 150.

The integrated control unit 141 determines whether input received from the operation panel 119 or the network communication circuitry 156 is a login, copy, print, scan to mail instruction, or the like. If a received input is a login, copy, print, scan to mail instruction, or the like, the integrated control unit 141 executes a control to such that login processing, copy processing, print processing, scan to mail processing, or the like is executed.

The integrated control unit 141 manages transition of frame images displayed on the display 130b of the operation panel 119.

The integrated control unit 141 stores, for each frame image, what types of touch operation can be received when the frame image is displayed. That is, the integrated control unit 141 stores, for each frame image, whether swipe, pinch-in, pinch-out, point contact, and other operations can be received as touch operations. Normally, point contact can be received regardless of which frame image is displayed. Further, when a frame image including a list is displayed together with a scroll bar, a swipe can be received. Further, when a frame image including a preview image or the like is displayed, pinch-out and pinch-in can be received.

The integrated control unit 141 reads out size and position 181 of the first detection area from the storage circuitry 160, and sets the first detection area as a detection area for detecting a touch operation.

(2) Area Determination Unit 142

The area determination unit 142 receives a detection signal from the touch unit 130a via the input/output circuitry 158. Here, a received detection signal is, for example, one detection signal or an aggregate of detection signals as illustrated in FIG. 3A, 3B, 3C, 3D. The following refers simply to "a detection signal".

The area determination unit 142 determines whether or not a received detection signal indicates a position within a detection area that is currently set (first detection area or second detection area). If a received detection signal does not indicate a position within a detection area that is currently set, the received detection signal is not received as a swipe, pinch-out, or pinch-in. In other words, the received detection signal may be received as an operation other than swipe, pinch-out, or pinch-in, such as a point contact operation, for example. On the other hand, if a received detection signal does indicate a position within a detection area that is currently set, the received detection signal is received as a touch operation that might be a swipe, pinch-out, or pinch-in.

In this way, the area determination unit 142 determines whether or not a touch operation has been performed in a first detection area or a second detection area that has been set.

Upon receiving a detection signal, the area determination unit 142 writes the received detection signal to the storage circuitry 160 together with information indicating an ordinal number of reception.

The area determination unit 142 controls the trajectory determination unit 143 to determine what kind of operation a touch operation indicated by a detection signal is: swipe, pinch-out, pinch-in, point contact, or some other operation. Further, the area determination unit 142 controls the trajectory determination unit 143 to determine a number of fingers used by a user in a touch operation indicated by the detection signal.

(3) Trajectory Determination Unit 143

The trajectory determination unit 143 performs the following under the control of the area determination unit 142.

The trajectory determination unit 143 determines whether a trajectory drawn by a received detection signal is a point or a line.

Here, as illustrated in FIG. 2B, the trajectory determination unit 143 determines that a trajectory is a point when only one detection signal is received.

Further, as illustrated in FIG. 2C, 2D, 2E, the trajectory determination unit 143 determines that a trajectory is a line when an aggregate of detection signals is received. In such a case, as illustrated in FIG. 3B, 3C, 3E, the trajectory determination unit 143 determines a direction of the line based on an arrangement of detection signals included in the aggregate. Here, when the trajectory is determined to be one line, the trajectory determination unit 143 determines that a swipe operation was performed.

Further, as illustrated in FIG. 2D, 2E, when a plurality of aggregate signals is detected, the trajectory determination unit 143 determines that the trajectory is a plurality of lines. Here, the trajectory determination unit 143 determines a direction of each line. When there are two lines, the two lines are substantially on one line, and directions of the two lines are away from each other, the trajectory determination unit 143 determines that an operation is a pinch-out. Further, when there are two lines, the two lines are substantially on one line, and directions of the two lines are towards each other, the trajectory determination unit 143 determines that an operation is a pinch-in.

In this way, the trajectory determination unit 143 uses a received detection signal to determine whether or not a touch operation indicated by a detection signal is an operation drawing a predefined linear trajectory. Operations that draw predefined linear trajectories are swipe operations, pinch-out operations, and pinch-in operations. Further, the trajectory determination unit 143 uses a received detection signal to determine whether or not a touch operation indicated by a detection signal is an operation drawing a point.

The trajectory determination unit 143 outputs determination results to the detection control unit 144, the match determination unit 146, and the display control unit 145.

Further, the trajectory determination unit 143 determines the number of fingers used by a user in a detected touch operation. More specifically, the trajectory determination unit 143 uses a received detection signal to determine a number of fingers used by a user in a touch operation indicated by the detection signal. When the number of aggregate signals received is one, it is determined that the number of fingers used by the user is one. When the number of aggregate signals received is a plurality, it is determined that the number of fingers used by the user is equal to the number of aggregate signals.

The trajectory determination unit 143 outputs a number of fingers used to the match determination unit 146.

(4) Detection Control Unit 144

The detection control unit 144 receives from the trajectory determination unit 143 a determination result of whether or not a touch operation indicates an operation drawing a predefined linear trajectory.

Upon determination from the received determination result that a first touch operation indicates an operation drawing a predefined linear trajectory, the detection control unit 144 reads out size and position 182 of a second detection area from the storage circuitry 160, and sets the second detection area that is larger than the first detection area as a detection area for a next touch operation. The detection control unit 144 may read out size and position 183 of a detection area set by a user from the storage circuitry 160, and set the read out detection area as the second detection area that is larger than the first detection area as a detection area for a next touch operation. The detection control unit 144 controls the area determination unit 142 to detect a next touch operation in the second detection area.

Further, as illustrated in FIG. 9, when an icon image relating to an operation having a higher priority at a time of execution than an operation drawing a predefined linear trajectory is displayed onscreen, the detection control unit 144 sets the second detection area excluding an area corresponding to an area where the icon image is displayed.

(5) Display Control Unit 145

The display control unit 145 receives from the trajectory determination unit 143 a determination result of whether or not a touch operation indicated by a detection signal indicates an operation drawing a predefined linear trajectory. Upon determining that a received determination result indicates an operation drawing a predefined linear trajectory, the display control unit 145 controls the display 130b to switch content displayed onscreen according to the operation.

For example, in the frame image 301 illustrated in FIG. 4A, the display control unit 145 scrolls settings in the list 401 according to a swipe, to change displayed settings as shown in list 411 in the frame image 302 illustrated in FIG. 4B.

Further, the display control unit 145 receives a determination result from the match determination unit 146, described later, indicating whether or not an operation corresponding to a first detected touch operation and an operation corresponding to a next detected touch operation match or are similar. When a received determination result indicates a match or similarity, the display control unit 145 controls the display 130b to switch content displayed onscreen according to an operation corresponding to the next detected touch operation.

For example, according to a pinch-in operation or pinch-out operation, the display control unit 145 causes enlargement or reduction of the preview image 422 in the frame image 303 illustrated in FIG. 5, and causes enlargement or reduction of the preview image 432 as in the frame image 304 illustrated in FIG. 6A.

Here, a case where the operations match may mean that the first operation is pinch-in and the next operation is also pinch-in. Further, a case where the operations are similar may mean that the first operation is pinch-in and the next operation is pinch-out, or vice-versa.

Further, the display control unit 145 uses length of the linear trajectory corresponding to the first detected touch operation as a reference, and controls the display 130b to switch display content according to length of the linear trajectory corresponding to the next detected touch operation.

Here, for example, as illustrated in FIG. 10, the display control unit 145 causes scrolling distances to change in proportion to lengths of trajectories of the second and subsequent detection signals with reference to length of the trajectory of the first detection signal.

Further, the display control unit 145 receives from the trajectory determination unit 143 a determination result of whether or not the next detected touch operation indicates an operation drawing a point. Upon determining that a received determination result indicates an operation drawing a point, the display control unit 145 controls the display 130b to switch content displayed onscreen according to the operation.

Here, for example, as illustrated in FIG. 4B, when waiting for a swipe as a touch operation in the enlarged detection area 414, and a point contact is detected with respect to one of the numeric icons in the ten key area 417, the display control unit 145 considers that a number corresponding to the numeric icon targeted by the touch operation has been input, and controls the display 130b to change the display of number of copies to the number inputted.

(6) Match Determination Unit 146

The match determination unit 146 receives from the trajectory determination unit 143 a determination result of whether or not a next detected touch operation indicates an operation drawing a predefined linear trajectory. When a received determination result indicates an operation drawing a predefined linear trajectory, the match determination unit 146 determines whether or not the operation corresponding to the first detected touch operation and the operation corresponding to the next detected touch operation match or are similar.

More specifically, the match determination unit 146 determines whether or not there is a match or similarity by comparing a trajectory of a line corresponding to the first detected touch operation (first trajectory) to a trajectory of a line corresponding to the next detected touch operation (next trajectory).

The first trajectory and the next trajectory are stored in the storage circuitry 160 as detection signals, respectively.

More specifically, when the first trajectory is a swipe and the next trajectory is also a swipe, the match determination unit 146 considers both trajectories to match. Further, when the first trajectory is a swipe and the next trajectory is a swipe in the opposite direction, the match determination unit 146 considers both trajectories to match. Further, when the first trajectory is a pinch-in and the next trajectory is also a pinch-in, the match determination unit 146 considers both trajectories to match. Further, when the first trajectory is a pinch-out and the next trajectory is also a pinch-out, the match determination unit 146 considers both trajectories to match.

Further, when the first trajectory is a pinch-out and the next trajectory is a pinch-in, the match determination unit 146 considers both trajectories to be similar, and vice-versa.

On the other hand, when the first trajectory is a pinch-out and the next trajectory is a swipe, the match determination unit 146 considers that both trajectories do not match, and vice-versa. Further, when the first trajectory is a pinch-in and the next trajectory is a swipe, the match determination unit 146 considers that both trajectories do not match, and vice-versa.

Further, when the first trajectory is a tap and the next trajectory is a swipe, the match determination unit 146 considers that both trajectories do not match, and vice-versa.

Further, the match determination unit 146 receives a number of fingers used by a user from the trajectory determination unit 143. The match determination unit 146 uses the received number of fingers to determine whether or not a number of fingers used in the first detected touch operation and the number of fingers used in the next detected touch operation are different, and when different, determines that the operation corresponding to the first detected touch operation and the operation corresponding to the second detected touch operation do not match and are not similar.

More specifically, the match determination unit 146, when the first trajectory is a one-finger operation (swipe) and the second trajectory is also a one-finger operation (swipe), considers both operations to match.

Further, the match determination unit 146, when the first trajectory is a two-finger operation (pinch-in or pinch-out) and the second trajectory is also a two-finger operation (pinch-in or pinch-out), considers both operations to match.

On the other hand, the match determination unit 146, when the first trajectory is a two-finger operation (pinch-in or pinch-out) and the second trajectory is a one-finger operation (swipe), or vice-versa, considers that both operations do not match.

The match determination unit 146 outputs the determination result of whether or not a match or similarity is found to the cancellation unit 147 and the display control unit 145.

(7) Cancellation Unit 147

The cancellation unit 147 determines whether or not a cancellation condition is satisfied for returning a detection area used by the touch unit 130a from the second detection area to the first detection area.

A cancellation condition is satisfied in the following situations.
- (a) When a determination result received from the match determination unit 146 indicates that a linear trajectory corresponding to a first detected touch operation does not match and is not similar to a linear trajectory corresponding to a next detected touch operation.
- (b) When an operation instruction to return from the second detection area to the first detection area is received from the operation panel 119 (cancellation receiver) via the input/output circuitry 158 due to operation by a user.
- (c) When a detection signal of a touch operation by a user is received from the touch unit 130a in an area outside the second detection area.
- (d) When an operation instruction is received by voice from the microphone 115b via the input circuitry 161.
- (e) When a next touch operation is not received from the touch unit 130a after a defined time has elapsed from a time when a touch operation was first detected.

When a cancellation condition is satisfied, the cancellation unit 147 returns the detection area used by the touch unit 130a from the second detection area to the first detection area, as described below.

The cancellation unit 147 receives a determination result from the match determination unit 146 indicating whether or not an operation corresponding to a first detected touch operation and an operation corresponding to a next detected touch operation match or are similar. When a determination result received from the match determination unit 147 indicates that a linear trajectory corresponding to a first detected touch operation does not match and is not similar to a linear trajectory corresponding to a next detected touch operation, the cancellation unit 147 returns the detection area from the second detection area to the first detection area.

Further, the cancellation unit 147 receives an operation instruction from the operation panel 119 via the input/output circuitry 158 to return from the second detection area to the first detection area due to an operation by a user. Upon receiving such an operation instruction, the cancellation unit 147 returns the detection area from the second detection area to the first detection area.

Further, the cancellation unit 147 receives a detection signal from the touch unit 130a of a touch operation from a user in an area outside the second detection area. Upon receiving a detection signal of such a touch instruction, the cancellation unit 147 returns the detection area from the second detection area to the first detection area.

Further, the cancellation unit 147 receives an operation instruction generated by the audio recognition unit 148 based on audio received from the microphone 115b via the input circuitry 161. Upon receiving such an operation instruction generated based on audio, the cancellation unit 147 returns the detection area from the second detection area to the first detection area, regardless of content of a received operation instruction.

Further, when a next touch operation is not received from the touch unit 130a even after a defined time has elapsed from detection of a first touch operation, that is, when a next touch operation is not detected, the cancellation unit 147 returns the detection area from the second detection area to the first detection area.

Here, a user may be able to set a defined time for each operation.

Further, it may be possible to set a defined time for each registered user. For example, a defined time may be set to "0.5 seconds" for user A, and "1.7 seconds" for user B.

(8) Notification Unit 149

The notification unit 149 stores a notification mode. The notification mode is set to either ON or OFF. When the notification mode is set to ON by a user, this indicates that the user is notified when detection of a next operation is active. On the other hand, when the notification mode is set to OFF by a user, this indicates that the user is not notified when detection of a next operation is active in the second detection area.

When the notification mode is ON, the notification unit 149 notifies a user that detection of a next touch operation is active in the second detection area larger than the first detection area, as described below.

The notification unit 149 controls the display 130b such that an indication that detection is active in the second detection area is displayed on the display surface of the display 130b.

Further, the notification unit 149 may control the output circuitry 162 to notify by sound that detection is active in the second detection area. In this case, the speaker 115a outputs an audio indication that detection is active.

Further, the notification unit 149 may control the output circuitry 163 to notify by vibration that detection is active in the second detection area. According to control of the output circuitry 163, the vibrator vibrates. In this way, the vibrator vibrates to notify a user that detection is active in the second detection area.

Further, as an example, as illustrated in FIG. 14, the notification unit 149 may control the display 130b to display highlighting or emphasis of the second detection area or an area outside the second detection area on the display surface of the display 130b.

(9) Audio Recognition Unit 148

The audio recognition unit 148 receives a digital audio signal from the input circuitry 161 connected to the microphone 115b. The audio recognition unit 148 analyzes a received digital audio signal and performs audio recognition processing. For example, the audio recognition unit 148 generates an instruction indicating "start copying" when an audio signal is "start copying". Further, the audio recognition unit 148 generates an instruction indicating "display print setting screen" when an audio signal is "display print setting screen". The audio recognition unit 148 outputs a generated instruction to the cancellation unit 147.

(10) Audio Generation Unit 150

The audio generation unit 150, under control of the notification unit 149, generates a digital audio signal indicating that detection is active in the second detection area, and outputs the generated digital audio signal to the output circuitry 162. The output circuitry 162 converts a digital audio signal received from the audio generation unit 150 into an analog audio signal. The speaker 115a outputs a digital audio signal indicating that detection is active in the second detection region.

1.6. Operations when Touch Operation is Received by Image Forming Device 10

Figure 15:
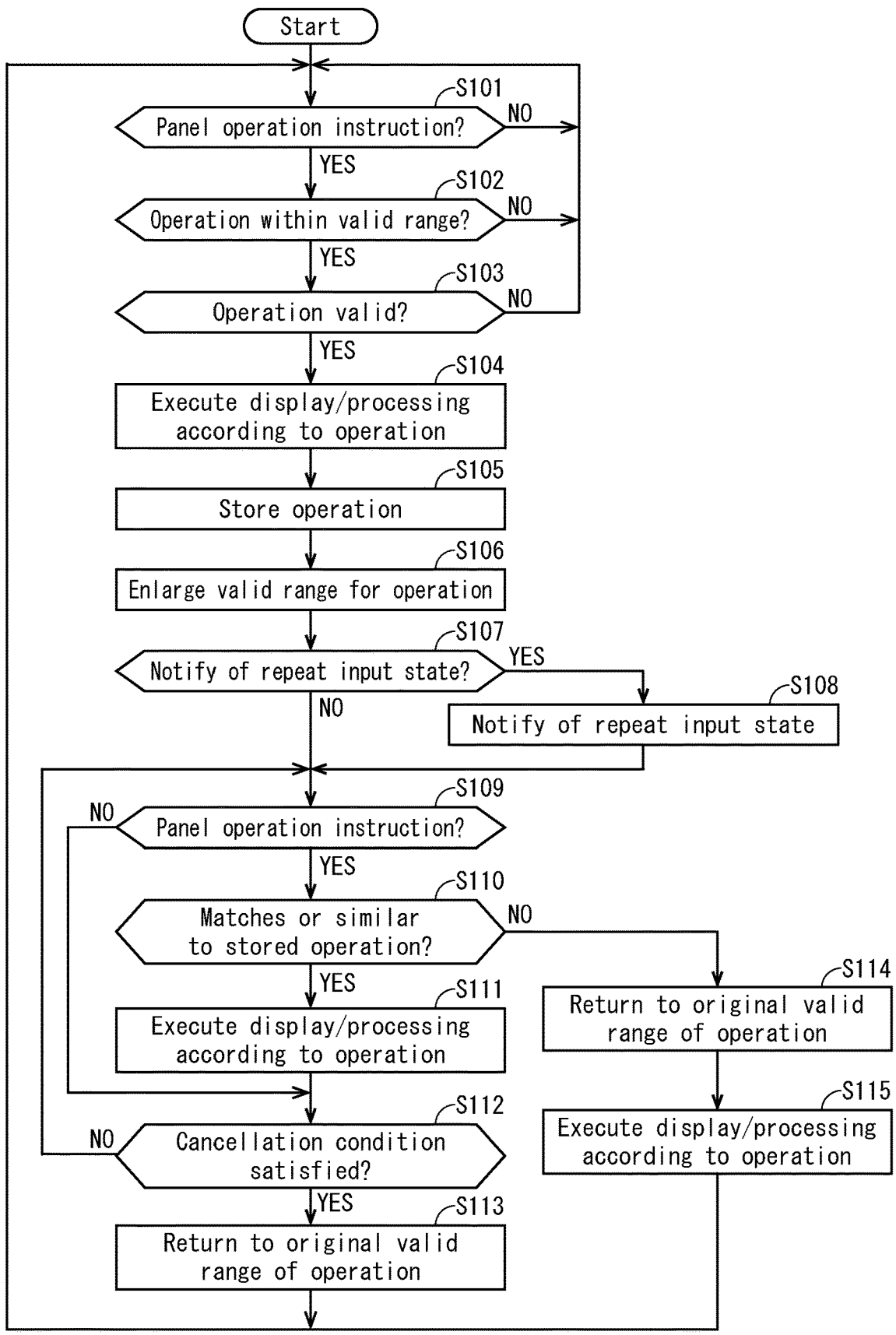
FIG. 15 is a flowchart illustrating operations of the image forming device 10.

Operations when swipe, pinch-in, and pinch-out touch operations are received by the image forming device 10 are described with reference to the flowchart illustrated in FIG. 15.

The touch unit 130a waits until a touch operation is received from a user (step S101: "NO").

When a touch operation (detection signal) is received (step S101: "YES"), the area determination unit 142 determines whether or not the received detection signal indicates a position within a detection area that is currently set (first detection area or second detection area). That is, the area determination unit 142 determines whether or not the received detection signal indicates a position within a valid range (step S102).

When it is determined that the received detection signal does not indicate a position within a valid range (step S102: "NO"), the integrated control unit 141 returns processing to step S101.

When it is determined that the received detection signal indicates a position within a valid range (step S102: "YES"), the trajectory determination unit 143 determines whether or not the touch operation is a valid operation, that is, a swipe, pinch-in, or pinch-out (indicates an action that draws a linear trajectory), or some other operation (step S103).

When it is determined that the touch operation is some other operation (step S103: "NO"), the integrated control unit 141 returns processing to step S101.

When it is determined that the touch operation is a swipe, pinch-in, or pinch-out (step S103: "YES"), the integrated control unit 141 controls the display control unit 145, the network communication circuitry 156, the scanner control circuitry 157, the printer control circuitry 159, and the like, to execute display or processing according to the touch operation (step S104).

The area determination unit 142 stores the received touch operation, that is, writes the received detection signal to the storage circuitry 160 (step S105).

The detection control unit 144 enlarges the detection area that is the effective range of the touch operation, setting the second detection area (step S106).

The notification unit 149 determines whether or not to notify a user of a repeat input state, based on a set notification mode (step S107). When it is determined to notify a user of a repeat input state (step S108: "YES"), the notification unit 149 notifies the user of the repeat input state (step S108).

Next, when the touch unit 130a receives a touch operation from a user (step S109: "YES"), the match determination unit 146 determines whether or not the received touch operation and the stored touch operation match or are similar to each other (step S110).

When a match or similarity is determined (step S110: "YES"), the integrated control unit 141 controls the display control unit 145, the network communication circuitry 156, the scanner control circuitry 157, the printer control circuitry 159, and the like, to execute display or processing according to the received touch operation (step S111).

Next, the cancellation unit 147 determines whether or not a cancellation condition for cancelling the second detection area is satisfied (step S112). When it is determined that the cancellation condition is not satisfied (step S112: "NO"), the integrated control unit 141 returns processing to step S109.

When it is determined that the cancellation condition is satisfied (step S112: "YES"), the cancellation unit 147 restores an original valid range for touch operations. That is, the cancellation unit 147 restores the detection area from the second detection area to the first detection area (step S113). Next, the integrated control unit 141 returns processing to step S101.

When no match or similarity is determined (step S110: "NO"), the cancellation unit 147 restores an original valid range for touch operations. That is, the cancellation unit 147 restores the detection area from the second detection area to the first detection area (step S114). The integrated control unit 141 controls the display control unit 145, the network communication circuitry 156, the scanner control circuitry 157, the printer control circuitry 159, and the like, to display or execute processing according to the received touch operation (step S115). Next, the integrated control unit 141 returns processing to step S101.

When the touch unit 130a does not receive a touch operation from a user (step S109: "NO"), the integrated control unit 141 causes processing to proceed to step S112.

This completes the description of operations when receiving swipe, pinch-in, and pinch-out touch operations.

1.7. Review

As described above, according to Embodiment 1, when it is determined that the operation drawing a linear trajectory is indicated, the next touch operation is detected in the second detection area that is larger than the first detection area, and this has an effect of facilitating linear touch operations from the second time onwards.

2. OTHER MODIFICATIONS

Embodiments and modifications are described above. However, the present disclosure is not limited to the embodiments and modifications described above, and includes the following modifications.

(1) As described above, the image forming device 10 is a tandem type color MFP that has scanner, printer, and copier functions. However, the present disclosure is not limited to this. Instead of the image forming device 10, the present disclosure may be applied to a printer that has a printer function. Further, instead of the image forming device 10, the present disclosure may be applied to an image reader that has a scanner function.

(2) The present disclosure includes any combination of embodiments or modifications described above.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. An input device comprising:
a touchscreen sensor that detects a touch operation from a user;
a non-transitory computer-readable recording medium comprising a program; and
a hardware processor that executes the program to operate as:
an area determination unit that is operable in a first mode to determine whether a detected touch operation is performed in a first detection area and in a second mode to determine whether the detected touch operation is performed in a second detection area that is larger than the first detection area;

a trajectory determination unit that, when it is determined that a first detected touch operation is performed in the first detection area, determines whether or not the first detected touch operation is an operation drawing a linear trajectory; and a detection control unit that, when it is determined that the first detected touch operation is the operation drawing a linear trajectory, controls the area determination unit to switch to the second mode so as to determine whether a next touch operation is performed in the second detection area that is larger than the first detection area.

2. The input device of claim 1, further comprising a display that has a screen overlapping with the touchscreen sensor, wherein the hardware processor further operates as a display control unit that, when it is determined that the detected touch operation is the operation drawing a linear trajectory, controls the display to change content displayed on the screen according to the operation.

3. The input device of claim 2, wherein position and size of the second detection area is preset for each content that is possible to display on the screen.

4. The input device of claim 2, wherein when a predetermined icon image is displayed on the screen, the detection control unit controls the area determination unit to exclude an area corresponding to the predetermined icon image from the second detection area.

5. The input device of claim 1, wherein position and size of the second detection area are set by a user.

6. The input device of claim 2, wherein the trajectory determination unit further determines whether or not the next detected touch operation is an operation drawing a linear trajectory, and the hardware processor further operates as a match determination unit that, when it is determined that the next detected touch operation is the operation drawing a linear trajectory, determines whether or not the operation corresponding to the first detected touch operation and the operation corresponding to the next detected touch operation match or are similar, wherein the display control unit, when a match or similarity is determined, controls the display to change content displayed on the screen according to the operation corresponding to the next detected touch operation.

7. The input device of claim 6, wherein the match determination unit determines by comparing the linear trajectory corresponding to the first detected touch operation with the linear trajectory corresponding to the next detected touch operation.

8. The input device of claim 7, wherein the display control unit further controls the display to change content displayed on the screen according to length of the linear trajectory corresponding to the next detected touch operation, based on length of the linear trajectory corresponding to the first detected touch operation.

9. The input device of claim 6, wherein the trajectory determination unit further determines a number of fingers used by a user in a detected touch operation, and when a number of fingers used in the first detected touch operation and a number of fingers used in the next detected touch operation are different, the match determination unit determines that the operation corresponding to the first detected touch operation and the operation corresponding to the next detected touch operation do not match and are not similar.

10. The input device of claim 2, wherein the trajectory determination unit further determines whether or not the next detected touch operation is an operation drawing a point, and the display control unit, when it is determined that the next detected touch operation is an operation drawing a point, controls the display to change the content displayed on the screen according to the operation.

11. The input device of claim 1, wherein the hardware processor further operates as a cancellation unit that switches the area determination unit from the second mode to the first mode so as to restore the detection area used by the area determination unit to the first detection area from the second detection area.

12. The input device of claim 11, wherein the hardware processor further operates as a match determination unit that determines whether or not the operation corresponding to the first detected touch operation and the operation corresponding to the next detected touch operation match or are similar, wherein the cancellation unit, when the match determination unit determines that the linear trajectory corresponding to the first detected touch operation and the linear trajectory corresponding to the next detected touch operation do not match and are not similar, switches the area determination unit from the second mode to the first mode.

13. The input device of claim 11, wherein the cancellation unit, when a next touch operation is not detected even after a defined time elapses from the first detected touch operation, switches the area determination unit from the second mode to the first mode.

14. The input device of claim 11, further comprising a cancellation receiver that is operable to receive an operation from a user to switch the area determination unit from the second mode to the first mode, wherein when the cancellation receiver receives the operation to restore the first detection area, the cancellation unit switches the area determination unit from the second mode to the first mode.

15. The input device of claim 11, wherein when the area determination unit detects a touch operation in an area outside the second detection area, the cancellation unit switches the area determination unit from the second mode to the first mode.

16. The input device of claim 11, further comprising an audio input unit that is operable to receive audio input from a user, wherein when the audio input unit receives audio input, the cancellation unit switches the area determination unit from the second mode to the first mode.

17. The input device of claim 1, wherein the hardware processor further operates as a notification unit that executes a control to notify a user that detection of a next touch operation is being performed in the second detection area that is larger than the first detection area.

18. The input device of claim 17, further comprising a display that has a screen overlapping with the touchscreen sensor, wherein a maximum detection area that can be detected by the touchscreen sensor coincides with a display area of the screen, and the second detection area is set within the maximum detection area, and the notification unit controls the display so that the second detection area or an area outside the second detection area is highlighted.

19. An image forming device comprising the input device of claim 1.

20. An input method used in an input device comprising a touchscreen sensor that detects a touch operation from a user, the input method comprising:

determining whether a detected touch operation is performed in a first detection area;

when it is determined that the detected touch operation is performed in the first detection area, determining whether or not the detected touch operation is an operation drawing a linear trajectory; and when it is determined that the detected touch operation is the operation drawing a linear trajectory, determining whether a next touch operation is performed in a second detection area that is larger than the first detection area.

\* \* \* \* \*